(12) United States Patent
Pervan

(10) Patent No.: US 12,077,968 B2
(45) Date of Patent: Sep. 3, 2024

(54) MECHANICAL LOCKING SYSTEM FOR FLOOR PANELS

(71) Applicant: Ceraloc Innovation AB, Viken (SE)

(72) Inventor: Darko Pervan, Viken (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

(21) Appl. No.: 17/812,281

(22) Filed: Jul. 13, 2022

(65) Prior Publication Data

US 2023/0003035 A1 Jan. 5, 2023

Related U.S. Application Data

(63) Continuation of application No. 16/815,985, filed on Mar. 11, 2020, now Pat. No. 11,434,646, which is a (Continued)

(30) Foreign Application Priority Data

Jul. 9, 2013 (SE) .................................... 1350856-9
Jun. 10, 2014 (SE) .................................... 1400291-9

(51) Int. Cl.
*E04F 15/02* (2006.01)
*B32B 3/06* (2006.01)
(Continued)

(52) U.S. Cl.
CPC .......... *E04F 15/02038* (2013.01); *B32B 3/06* (2013.01); *B32B 3/30* (2013.01);
(Continued)

(58) Field of Classification Search
CPC ................................................ E04F 15/02038
See application file for complete search history.

(56) References Cited

U.S. PATENT DOCUMENTS 87,853 A 3/1869 Kappes
108,068 A 10/1870 Utley
(Continued)

FOREIGN PATENT DOCUMENTS

CA 2916212 A1 1/2015
CN 1306595 A 8/2001
(Continued)

OTHER PUBLICATIONS

Extended European Search Report issued in EP 14 82 3598.9, dated Feb. 23, 2017, European Patent Office, Munich, DE, 9 pages.
(Continued)

*Primary Examiner* — Babajide A Demuren
(74) *Attorney, Agent, or Firm* — Boone IP Law

(57) ABSTRACT

Ceramic and stone tiles are shown, which are provided with a locking system including a separate strip part connected to vertical and horizontal grooves formed in the tile edge. A set of ceramic or stone tiles including a first tile provided with a first edge and a second tile provided with a second edge wherein the tiles are provided with a locking system for locking the first edge to the second edge in a horizontal direction parallel with a tile surface and in a vertical direction perpendicular to the horizontal direction, said locking system includes a first and a second tongue and a strip part provided with a first and a second locking element.

15 Claims, 25 Drawing Sheets

Related U.S. Application Data continuation of application No. 16/102,914, filed on Aug. 14, 2018, now Pat. No. 10,633,870, which is a continuation of application No. 14/902,706, filed as application No. PCT/SE2014/050877 on Jul. 8, 2014, now Pat. No. 10,060,139.

(51) Int. Cl.

| | | |
|---|---|---|
| *B32B 3/30* | (2006.01) | |
| *B32B 5/14* | (2006.01) | |
| *B32B 9/00* | (2006.01) | |
| *B32B 21/02* | (2006.01) | |
| *B32B 21/06* | (2006.01) | |
| *B32B 27/30* | (2006.01) | |
| *B32B 27/32* | (2006.01) | |
| *B32B 29/00* | (2006.01) | |
| *E04C 2/28* | (2006.01) | |
| *E04C 2/38* | (2006.01) | |
| *E04F 13/08* | (2006.01) | |
| *E04F 13/14* | (2006.01) | |
| *E04F 13/24* | (2006.01) | |
| *E04F 13/26* | (2006.01) | |
| *E04F 15/08* | (2006.01) | |

(52) U.S. Cl.
CPC ............... *B32B 5/14* (2013.01); *B32B 9/002* (2013.01); *B32B 9/005* (2013.01); *B32B 21/02* (2013.01); *B32B 21/06* (2013.01); *B32B 27/304* (2013.01); *B32B 27/32* (2013.01); *B32B 29/002* (2013.01); *E04C 2/28* (2013.01); *E04C 2/38* (2013.01); *E04F 13/0801* (2013.01); *E04F 13/14* (2013.01); *E04F 13/24* (2013.01); *E04F 13/26* (2013.01); *E04F 15/02016* (2013.01); *E04F 15/087* (2013.01); *B32B 2260/026* (2013.01); *B32B 2260/028* (2013.01); *B32B 2260/046* (2013.01); *B32B 2262/067* (2013.01); *B32B 2307/732* (2013.01); *B32B 2307/75* (2013.01); *B32B 2419/04* (2013.01); *B32B 2471/00* (2013.01); *E04F 2201/0115* (2013.01); *E04F 2201/0146* (2013.01); *E04F 2201/0153* (2013.01); *E04F 2201/0161* (2013.01); *E04F 2201/03* (2013.01); *E04F 2201/042* (2013.01); *E04F 2201/043* (2013.01); *E04F 2201/0517* (2013.01); *E04F 2201/0547* (2013.01); *E04F 2201/0552* (2013.01)

(56) References Cited

U.S. PATENT DOCUMENTS

| | | | |
|---|---|---|---|
| 213,740 | A | 4/1879 | Conner |
| 274,354 | A | 3/1883 | McCarthy |
| 876,693 | A | 1/1908 | Coldwell |
| 2,430,200 | A | 11/1947 | Wilson |
| 2,889,016 | A | 6/1959 | Warren |
| 3,099,110 | A | 7/1963 | Spaight |
| 3,147,522 | A | 9/1964 | Schumm |
| 3,731,445 | A | 5/1973 | Hoffmann et al. |
| 3,919,159 | A | 11/1975 | Burns |
| 3,939,546 | A | 2/1976 | Hernandez |
| 4,169,688 | A | 10/1979 | Toshio |
| 4,426,820 | A | 1/1984 | Terbrack et al. |
| 4,447,172 | A | 5/1984 | Galbreath |
| 4,512,131 | A | 4/1985 | Laramore |
| 4,599,841 | A | 7/1986 | Haid |
| 4,819,932 | A | 4/1989 | Trotter, Jr. |
| 5,135,597 | A | 8/1992 | Barker |
| 5,272,850 | A | 12/1993 | Mysliwiec et al. |
| 5,295,341 | A | 3/1994 | Kajiwara |
| 5,435,610 | A | 7/1995 | Roberts |
| 5,485,702 | A | 1/1996 | Sholton |
| 5,577,357 | A | 11/1996 | Civelli |
| 5,845,548 | A | 12/1998 | Nelson |
| 5,860,267 | A | 1/1999 | Pervan |
| 5,950,389 | A | 9/1999 | Porter |
| 5,970,675 | A | 10/1999 | Schray |
| 6,006,486 | A | 12/1999 | Moriau et al. |
| 6,182,410 | B1 | 2/2001 | Pervan |
| 6,203,653 | B1 | 3/2001 | Seidner |
| 6,214,924 | B1 | 4/2001 | Bieser et al. |
| 6,254,301 | B1 | 7/2001 | Hatch |
| 6,295,779 | B1 | 10/2001 | Canfield |
| 6,332,733 | B1 | 12/2001 | Hamberger et al. |
| 6,339,908 | B1 | 1/2002 | Chuang |
| 6,358,352 | B1 | 3/2002 | Schmidt |
| 6,418,683 | B1 | 7/2002 | Martensson et al. |
| 6,449,918 | B1 | 9/2002 | Nelson et al. |
| 6,450,235 | B1 | 9/2002 | Lee |
| 6,490,836 | B1 | 12/2002 | Moriau et al. |
| 6,550,206 | B2 | 4/2003 | Lee |
| 6,576,079 | B1 | 6/2003 | Kai |
| 6,584,747 | B2 | 7/2003 | Kettler et al. |
| 6,591,568 | B1 | 7/2003 | Pålsson |
| 6,681,820 | B2 | 1/2004 | Olofsson |
| 6,685,391 | B1 | 2/2004 | Gideon |
| 6,729,091 | B1 | 5/2004 | Martensson |
| 6,763,643 | B1 | 7/2004 | Mårtensson |
| 6,802,166 | B1 | 10/2004 | Gerhard |
| 6,851,241 | B2 | 2/2005 | Pervan |
| 6,854,235 | B2 | 2/2005 | Martensson |
| 6,880,305 | B2 | 4/2005 | Pervan et al. |
| 6,880,307 | B2 | 4/2005 | Schwitte et al. |
| 7,040,068 | B2 | 5/2006 | Moriau et al. |
| 7,051,486 | B2 | 5/2006 | Pervan |
| 7,108,031 | B1 | 9/2006 | Secrest |
| 7,171,790 | B2 | 2/2007 | Mei |
| 7,243,470 | B2 | 7/2007 | Chae |
| 7,257,926 | B1 | 8/2007 | Kirby |
| 7,637,068 | B2 | 12/2009 | Pervan |
| 7,654,055 | B2 | 2/2010 | Ricker |
| 7,677,005 | B2 | 3/2010 | Pervan |
| 7,716,889 | B2 | 5/2010 | Pervan |
| 7,757,452 | B2 | 7/2010 | Pervan |
| 7,805,902 | B2 | 10/2010 | Martel |
| 7,841,150 | B2 | 11/2010 | Pervan |
| 7,908,815 | B2 | 3/2011 | Pervan et al. |
| 7,980,039 | B2 | 7/2011 | Groeke et al. |
| 7,993,731 | B2 * | 8/2011 | Miller ............... B32B 7/02 428/212 |
| 8,006,458 | B1 | 8/2011 | Olofsson et al. |
| 8,146,303 | B2 | 4/2012 | Gibson et al. |
| 8,156,705 | B2 | 4/2012 | Alford et al. |
| 8,181,416 | B2 | 5/2012 | Pervan et al. |
| 8,234,830 | B2 | 8/2012 | Pervan et al. |
| 8,276,343 | B2 | 10/2012 | Yang |
| 8,302,367 | B2 | 11/2012 | Schulte |
| 8,336,272 | B2 | 12/2012 | Prager et al. |
| 8,341,915 | B2 | 1/2013 | Pervan et al. |
| 8,429,870 | B2 | 4/2013 | Chen et al. |
| 8,448,402 | B2 | 5/2013 | Pervan et al. |
| 8,607,532 | B2 | 12/2013 | Permesang |
| 8,640,418 | B2 | 2/2014 | Paetrow et al. |
| 8,650,826 | B2 | 2/2014 | Pervan et al. |
| 8,733,410 | B2 | 5/2014 | Pervan |
| 8,763,340 | B2 | 7/2014 | Pervan et al. |
| 9,003,736 | B2 | 4/2015 | Schoneveld et al. |
| 9,243,411 | B2 | 1/2016 | Pervan et al. |
| 9,314,936 | B2 | 4/2016 | Pervan |
| 10,060,139 | B2 | 8/2018 | Pervan |
| 10,633,870 | B2 | 4/2020 | Pervan |
| 2001/0010139 | A1 | 8/2001 | De Kerpel et al. |
| 2001/0024707 | A1 | 9/2001 | Andersson et al. |
| 2002/0046527 | A1 | 4/2002 | Nelson |
| 2002/0095894 | A1 | 7/2002 | Pervan |
| 2003/0009972 | A1 | 1/2003 | Pervan et al. |
| 2003/0037504 | A1 | 2/2003 | Schwitte et al. |
| 2003/0084636 | A1 | 5/2003 | Pervan |
| 2003/0180091 | A1 | 9/2003 | Stridsman |

(56) References Cited

U.S. PATENT DOCUMENTS

| | | |
|---|---|---|
| 2004/0016196 A1 | 1/2004 | Pervan |
| 2004/0139676 A1 | 7/2004 | Knauseder |
| 2004/0144050 A1 | 7/2004 | Kellner |
| 2004/0182033 A1 | 9/2004 | Wernersson |
| 2004/0211143 A1 | 10/2004 | Hanning |
| 2004/0213946 A1 | 10/2004 | Miller |
| 2004/0244325 A1 | 12/2004 | Nelson |
| 2004/0250492 A1 | 12/2004 | Becker |
| 2005/0028474 A1 | 2/2005 | Kim |
| 2005/0050827 A1 | 3/2005 | Schitter |
| 2005/0160694 A1 | 7/2005 | Pervan |
| 2005/0252130 A1 | 11/2005 | Martensson |
| 2006/0064940 A1 | 3/2006 | Cappelle |
| 2006/0070333 A1 | 4/2006 | Pervan |
| 2006/0130421 A1 | 6/2006 | Nollet et al. |
| 2006/0154015 A1 | 7/2006 | Miller et al. |
| 2006/0156670 A1 | 7/2006 | Knauseder |
| 2006/0236642 A1 | 10/2006 | Pervan |
| 2006/0260254 A1 | 11/2006 | Pervan |
| 2007/0014921 A1 | 1/2007 | Kimball et al. |
| 2007/0028547 A1 | 2/2007 | Grafenauer et al. |
| 2007/0151189 A1 | 7/2007 | Yang |
| 2007/0220822 A1 | 9/2007 | Permesang |
| 2007/0240376 A1 | 10/2007 | Engstrom |
| 2008/0028707 A1 | 2/2008 | Pervan |
| 2008/0041008 A1 | 2/2008 | Pervan |
| 2008/0092473 A1 | 4/2008 | Heyns |
| 2008/0184646 A1 | 8/2008 | Alford et al. |
| 2008/0216434 A1 | 9/2008 | Pervan |
| 2008/0216920 A1 | 9/2008 | Pervan |
| 2009/0019806 A1 | 1/2009 | Muehlebach |
| 2009/0107076 A1 | 4/2009 | Kim |
| 2009/0133353 A1 | 5/2009 | Pervan et al. |
| 2009/0151290 A1 | 6/2009 | Liu |
| 2009/0193741 A1 | 8/2009 | Cappelle |
| 2010/0170189 A1 | 7/2010 | Schulte |
| 2010/0173122 A1 | 7/2010 | Susnjara |
| 2010/0300029 A1 | 12/2010 | Braun et al. |
| 2011/0016815 A1 | 1/2011 | Yang |
| 2011/0113713 A1 | 5/2011 | Lui |
| 2011/0117325 A1 | 5/2011 | Segaert |
| 2011/0131916 A1 | 6/2011 | Chen et al. |
| 2011/0167750 A1 | 7/2011 | Pervan |
| 2011/0167751 A1 | 7/2011 | Engstrom |
| 2011/0197535 A1 | 8/2011 | Baker et al. |
| 2011/0268913 A1 | 11/2011 | Choo |
| 2011/0271632 A1 | 11/2011 | Cappelle et al. |
| 2012/0017533 A1 | 1/2012 | Pervan et al. |
| 2012/0096801 A1 | 4/2012 | Cappelle |
| 2012/0192521 A1 | 8/2012 | Schulte |
| 2013/0008117 A1 | 1/2013 | Pervan |
| 2013/0014463 A1 | 1/2013 | Pervan |
| 2013/0014891 A1 | 1/2013 | Vandevoorde et al. |
| 2013/0019555 A1 | 1/2013 | Pervan et al. |
| 2013/0036695 A1 | 2/2013 | Durnberger |
| 2013/0042562 A1 | 2/2013 | Pervan et al. |
| 2013/0042563 A1 | 2/2013 | Pervan et al. |
| 2013/0042564 A1 | 2/2013 | Pervan et al. |
| 2013/0042565 A1 | 2/2013 | Pervan et al. |
| 2013/0047536 A1 | 2/2013 | Pervan |
| 2013/0055950 A1 | 3/2013 | Pervan et al. |
| 2013/0104485 A1 | 5/2013 | Meersseman et al. |
| 2013/0160390 A1 | 6/2013 | Stockl |
| 2014/0013698 A1 | 1/2014 | Schoneveld et al. |
| 2014/0026513 A1 | 1/2014 | Bishop |
| 2014/0186109 A1 | 7/2014 | Wadsworth |
| 2014/0223849 A1 | 8/2014 | Mularoni |
| 2014/0223852 A1 | 8/2014 | Pervan |
| 2014/0245681 A1 | 9/2014 | Carrubba |
| 2014/0287194 A1 | 9/2014 | Pervan et al. |
| 2014/0352248 A1 | 12/2014 | Whispell et al. |
| 2015/0056416 A1 | 2/2015 | Maesen |
| 2015/0343739 A1 | 12/2015 | Pervan |
| 2016/0046144 A1 | 2/2016 | Thiers |
| 2016/0177577 A1 | 6/2016 | Cappelle et al. |
| 2016/0194885 A1 | 7/2016 | Whispell et al. |
| 2016/0201337 A1 | 7/2016 | Pervan et al. |
| 2017/0058537 A1 | 3/2017 | Lombaert et al. |
| 2017/0335571 A1 | 11/2017 | Hannig |
| 2018/0313094 A1 | 11/2018 | Pervan |
| 2020/0208412 A1 | 7/2020 | Pervan |
| 2023/0220680 A1 | 7/2023 | Pervan et al. |

FOREIGN PATENT DOCUMENTS

| | | |
|---|---|---|
| CN | 1383464 A | 12/2002 |
| CN | 2931657 Y | 8/2007 |
| CN | 201095854 Y | 8/2008 |
| CN | 101365852 A | 2/2009 |
| CN | 101622409 A | 1/2010 |
| CN | 201588375 U | 9/2010 |
| CN | 101910528 A | 12/2010 |
| CN | 102137978 A | 7/2011 |
| CN | 102301079 A | 12/2011 |
| CN | 102695838 A | 9/2012 |
| CN | 103748300 A | 4/2014 |
| CN | 203547074 U | 4/2014 |
| CN | 203603415 U | 5/2014 |
| CN | 105358777 A | 2/2016 |
| DE | 2159042 A1 | 6/1973 |
| DE | 3343601 A1 | 6/1985 |
| DE | 4215273 A1 | 11/1993 |
| DE | 4242530 A1 | 6/1994 |
| DE | 19601322 A1 | 5/1997 |
| DE | 102006020135 A1 | 11/2007 |
| EP | 0544593 A1 | 6/1993 |
| EP | 1120515 A1 | 8/2001 |
| EP | 1146182 A2 | 10/2001 |
| EP | 1441086 A1 | 7/2004 |
| EP | 1640530 A2 | 3/2006 |
| EP | 2492416 A1 | 8/2012 |
| ES | 1070838 U | 11/2009 |
| FR | 2810060 A1 | 12/2001 |
| JP | 06-146553 A | 5/1994 |
| JP | 4656333 B2 | 3/2011 |
| WO | 94/26999 A1 | 11/1994 |
| WO | 96/27721 A1 | 9/1996 |
| WO | 98/21428 A1 | 5/1998 |
| WO | 99/66151 A1 | 12/1999 |
| WO | 99/66152 A1 | 12/1999 |
| WO | 00/20705 A1 | 4/2000 |
| WO | 00/20706 A1 | 4/2000 |
| WO | 00/47841 A1 | 8/2000 |
| WO | 01/07729 A1 | 2/2001 |
| WO | 01/48331 A1 | 7/2001 |
| WO | 01/51732 A1 | 7/2001 |
| WO | 01/75247 A1 | 10/2001 |
| WO | 01/98604 A1 | 12/2001 |
| WO | 02/55809 A1 | 7/2002 |
| WO | 02/55810 A1 | 7/2002 |
| WO | 02/81843 A1 | 10/2002 |
| WO | 03/16654 A1 | 2/2003 |
| WO | 03/38210 A1 | 5/2003 |
| WO | 03/83234 A1 | 10/2003 |
| WO | 2004/083557 A1 | 9/2004 |
| WO | 2004/085765 A1 | 10/2004 |
| WO | 2005/003489 A1 | 1/2005 |
| WO | 2005/040521 A2 | 5/2005 |
| WO | 2006/043893 A1 | 4/2006 |
| WO | 2006/089025 A2 | 8/2006 |
| WO | 2006/063803 A3 | 10/2006 |
| WO | 2006/104436 A1 | 10/2006 |
| WO | 2007/015669 A2 | 2/2007 |
| WO | 2007/019957 A1 | 2/2007 |
| WO | 2007/081260 A1 | 7/2007 |
| WO | 2007/142589 A1 | 12/2007 |
| WO | 2008/004960 A2 | 1/2008 |
| WO | 2008/017281 A1 | 2/2008 |
| WO | 2008/017301 A2 | 2/2008 |
| WO | 2007/141605 A3 | 6/2008 |
| WO | 2008/116623 A1 | 10/2008 |
| WO | 2009/013590 A2 | 1/2009 |
| WO | 2009/075998 A2 | 6/2009 |
| WO | 2009/116926 A1 | 9/2009 |

(56) References Cited

FOREIGN PATENT DOCUMENTS

| WO | 2010/012116 | A1 | 2/2010 |
|---|---|---|---|
| WO | 2010/082171 | A2 | 7/2010 |
| WO | 2010/087752 | A1 | 8/2010 |
| WO | 2010/142671 | A1 | 12/2010 |
| WO | 2011/038709 | A1 | 4/2011 |
| WO | 2011/117179 | A1 | 9/2011 |
| WO | 2011/127981 | A1 | 10/2011 |
| WO | 2013/025165 | A1 | 2/2013 |
| WO | 2013/041264 | A1 | 3/2013 |

OTHER PUBLICATIONS

International Search Report and Written Opinion received for PCT Patent Application No. PCT/SE2014/050877, mailed on Oct. 28, 2014, 16 pages.
Josefsson, Per, U.S. Appl. No. 17/831,826 entitled "Mineral-Based Panel Comprising Grooves and a Method for Forming Grooves," filed in the U.S. Patent and Trademark Office on Jun. 3, 2022.
Laminate Flooring Tips (http://flooring.lifetips.com/cat/61734/laminate-flooring-tips/index.html- ). Copyright 2000. 12 pages.
Pervan, Darko (Author), Technical Disclosure entitled "VA070 Strip Part," IP.com No. IPCOM000210867D, Sep. 13, 2011, IP.com Prior Art Database, 43 pages.
U.S. Appl. No. 17/831,826, Darko pervan, filed Jul. 13, 2022.
U.S. Appl. No. 17/463,902, Per Josefsson, filed Sep. 1, 2021.
U.S. Appl. No. 17/705,465, Per Josefsson, filed Mar. 28, 2022.
U.S. Appl. No. 18/055,473, Per Josefsson, filed Nov. 15, 2022.
U.S. Appl. No. 18/209,359, Per Josefsson, filed Jun. 13, 2023.
U.S. Appl. No. 18/209,667, Per Josefsson, filed Jun. 14, 2023.
U.S. Appl. No. 18/210,429, Per Josefsson, filed Jun. 15, 2023.
U.S. Appl. No. 18/240,192, Per Josefsson, filed Aug. 30, 2023.
U.S. Appl. No. 18/295,559, Per Josefsson, filed Apr. 4, 2023.
U.S. Appl. No. 18/495,918, Per Josefsson, filed Oct. 27, 2023.
U.S. Appl. No. 18/425,012, Per Josefsson, filed Jan. 29, 2024.
Office Action received for Chinese Patent Application No. 201810078264, mailed on May 7, 2019, 13 pages (7 pages of English Translation and 6 pages of Original Document).
Office Action received for Chinese Patent Application No. 201810078970, mailed on Jun. 19, 2019, 12 pages (6 pages of English Translation and 6 pages of Original Document).
Office Action received for Chinese Patent Application No. 201810079481, mailed on Jul. 11, 2019, 13 pages (6 pages of English Translation and 7 pages of Original Document).
Office Action received for European Application No. 14823598, mailed on Apr. 30, 2021, 7 pages.
Office Action received for European Application No. 14823598, mailed on Feb. 26, 2020, 5 pages.
Office Action received for European Application No. 14823598, mailed on May 17, 2019, 7 pages.
The Fourth Office Action received for Chinese Patent Application No. 201810079481, mailed on Jan. 26, 2022, 14 pages (8 pages of English Translation and 6 pages of Original Document).
The Second Office Action received for Chinese Patent Application No. 201810078264, mailed on Apr. 9, 2020, 10 pages (6 pages of English Translation and 4 pages of Original Document).
The Second Office Action received for Chinese Patent Application No. 201810079481, mailed on May 29, 2020, 12 pages (7 pages of English Translation and 5 pages of Original Document).
The Third Office Action received for Chinese Patent Application No. 201810078264, mailed on Oct. 20, 2020, 11 pages (6 pages of English Translation and 5 pages of Original Document).
The Third Office Action received for Chinese Patent Application No. 201810079481, mailed on Mar. 3, 2021, 12 pages (7 pages of English Translation and 5 pages of Original Document).
U.S. Appl. No. 18/628,988, Per Josefsson, filed Apr. 8, 2024.

* cited by examiner

KNOWN TECHNOLOGY

KNOWN TECHNOLOGY

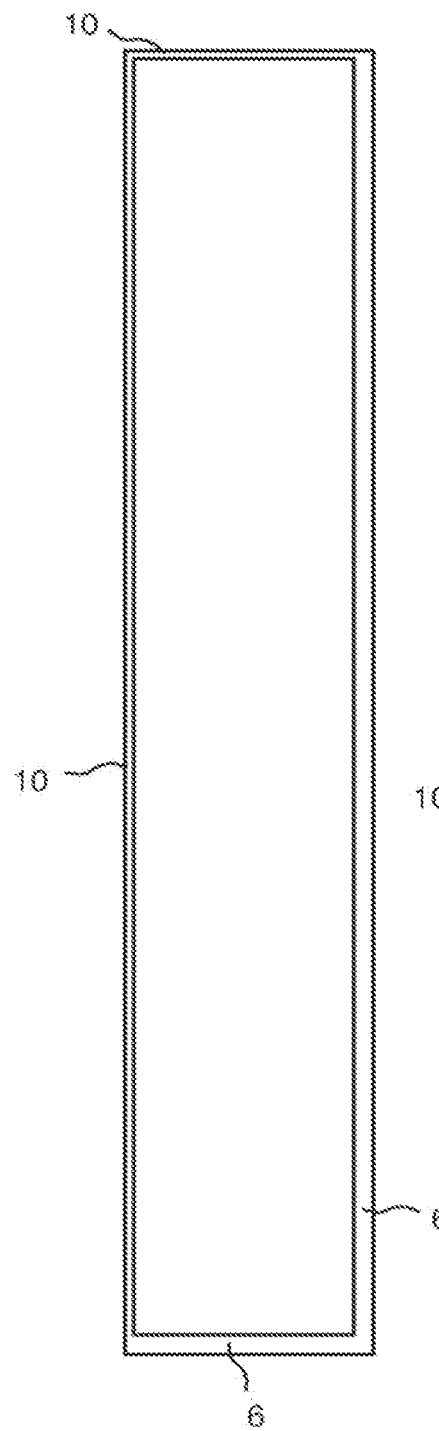
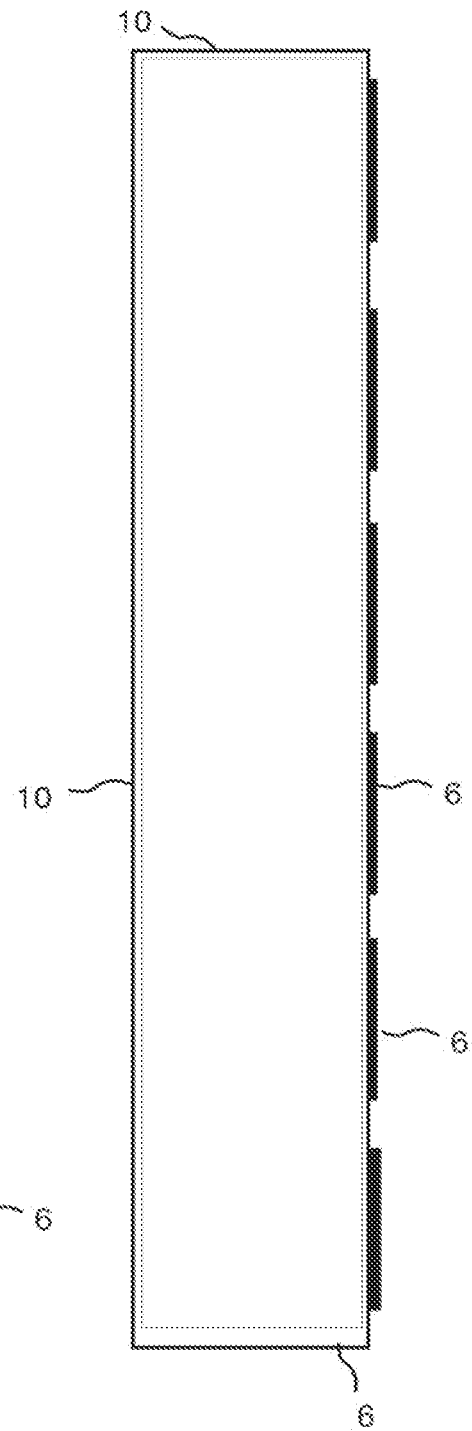
KNOWN TECHNOLOGY

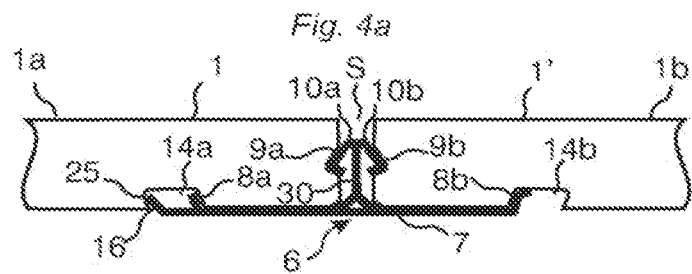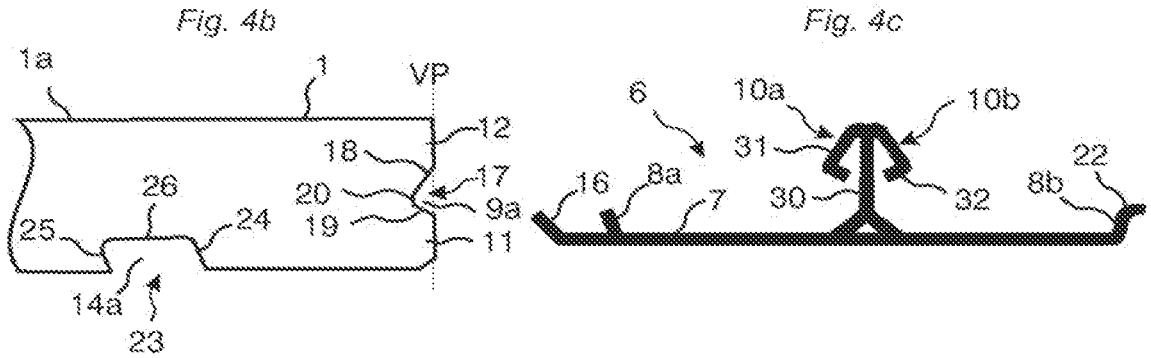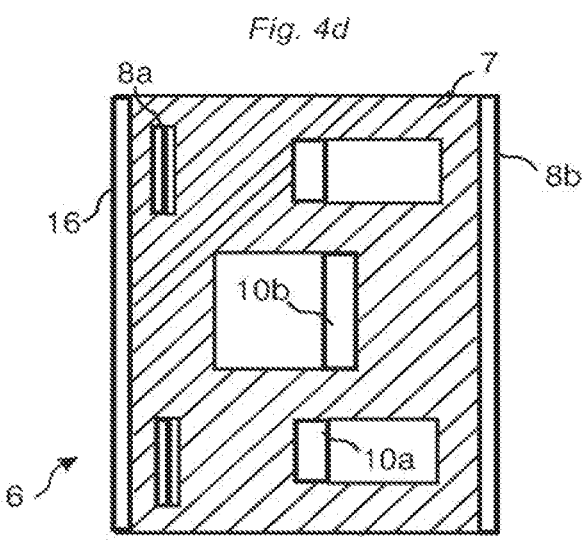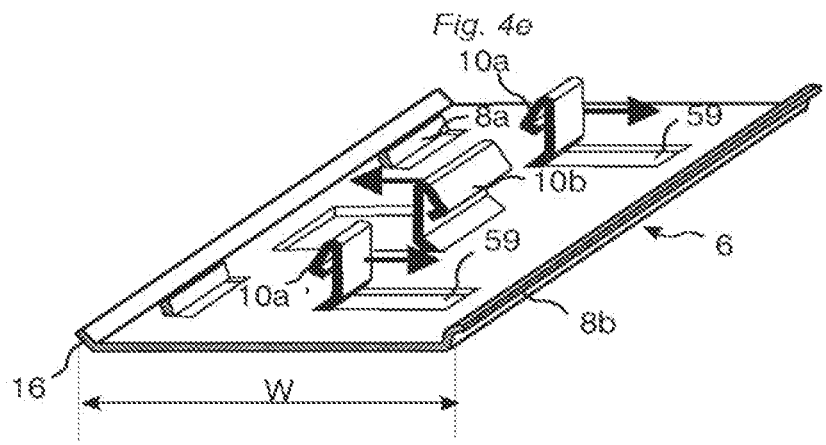

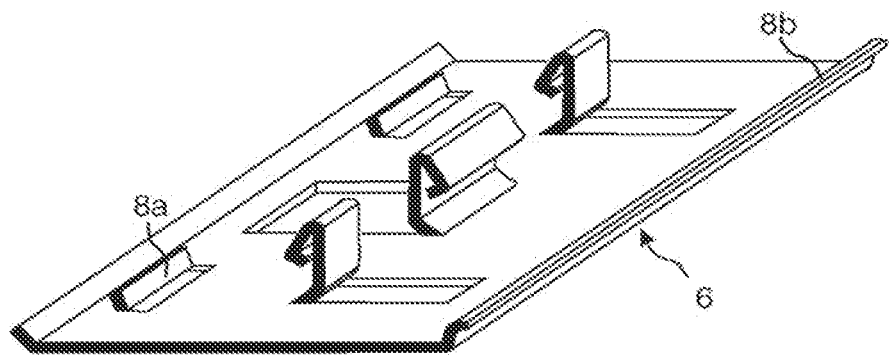
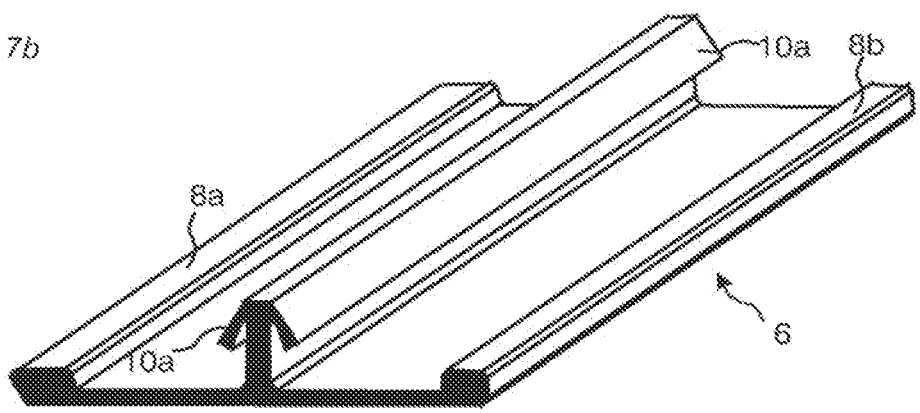
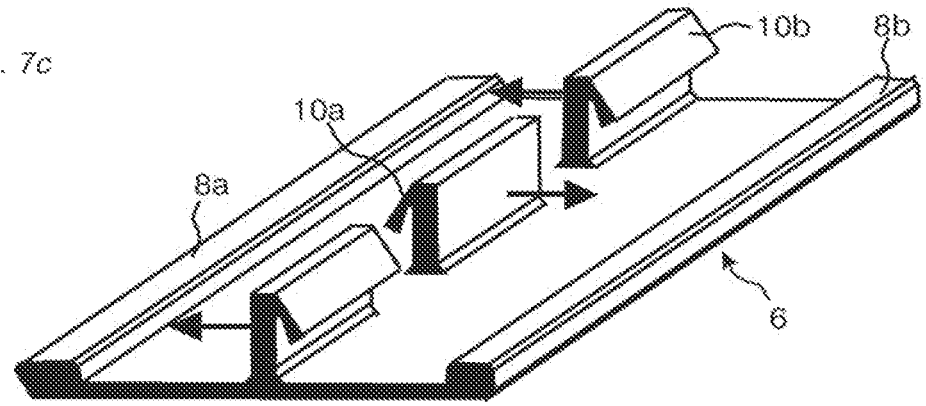
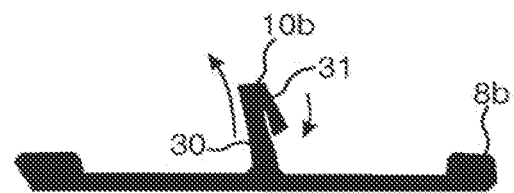

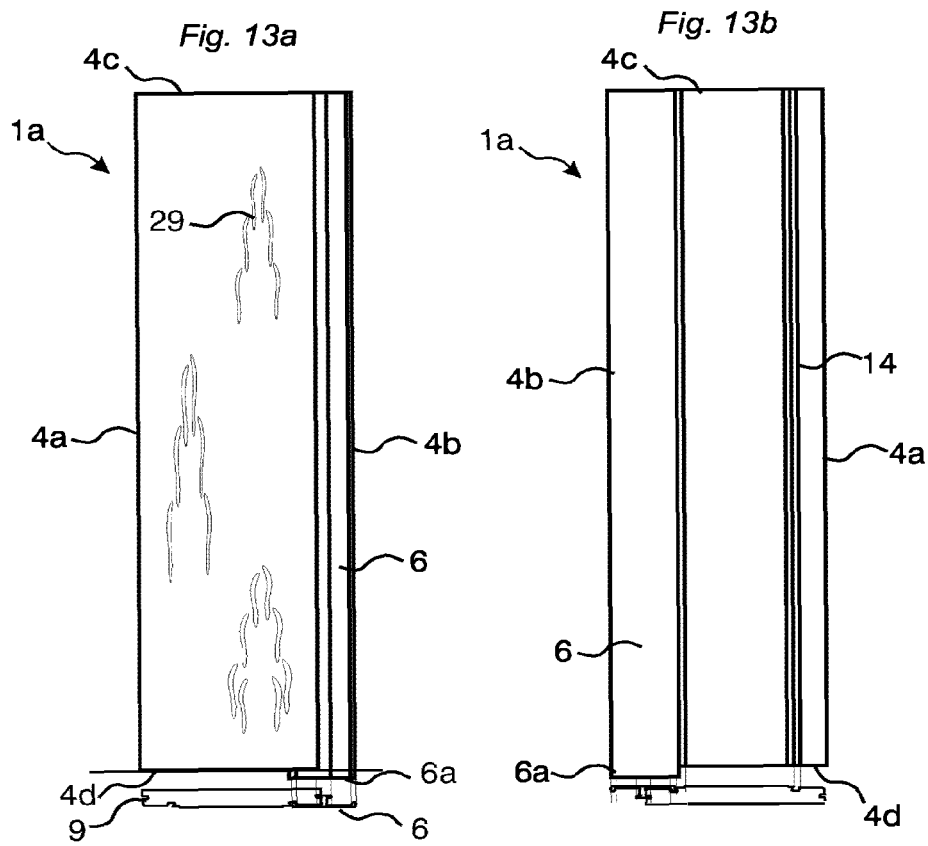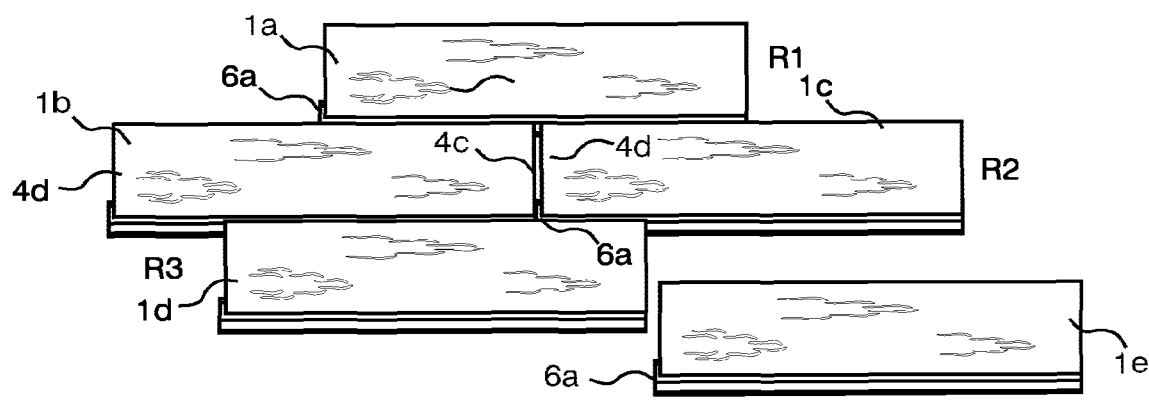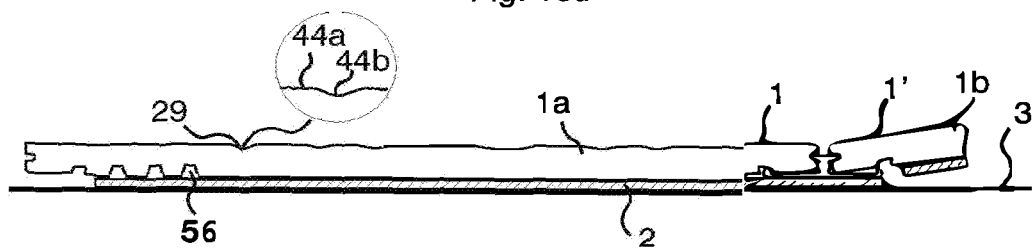

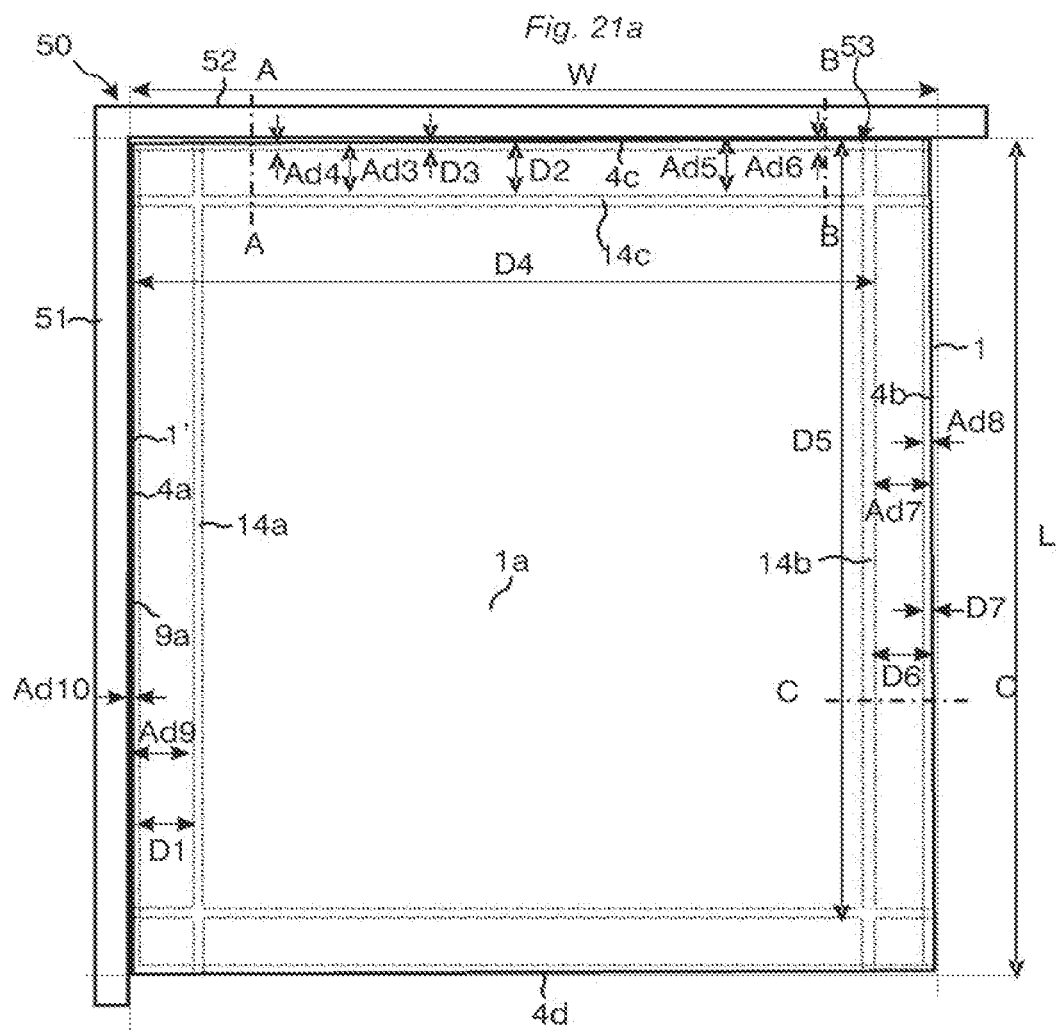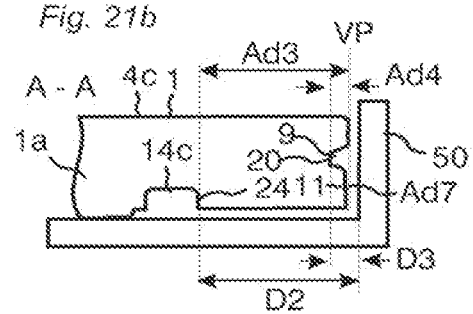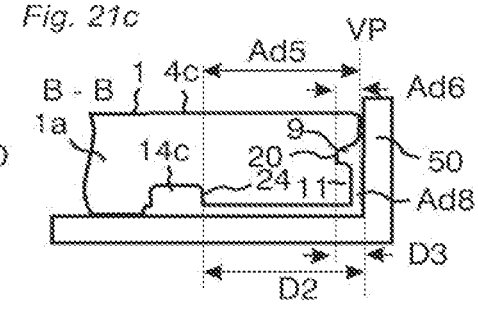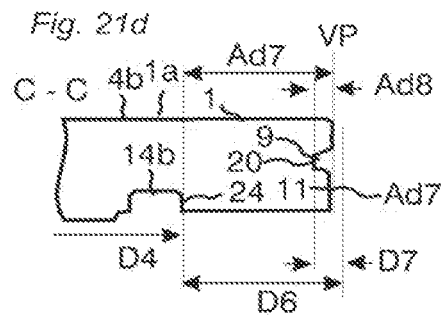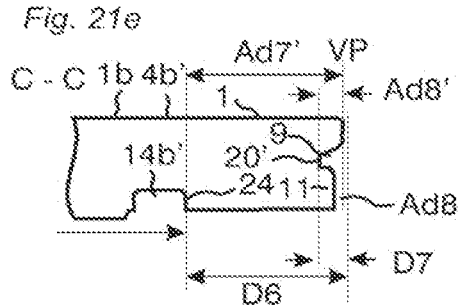

MECHANICAL LOCKING SYSTEM FOR FLOOR PANELS

CROSS REFERENCE TO RELATED APPLICATIONS

The present application is a continuation of U.S. application Ser. No. 16/815,985, filed on Mar. 11, 2020, which is a continuation of U.S. application Ser. No. 16/102,914, filed on Aug. 14, 2018, now U.S. Pat. No. 10,633,870, which is a continuation of U.S. application Ser. No. 14/902,706, filed on Jan. 4, 2016, now U.S. Pat. No. 10,060,139, which is a U.S. national stage of International Application No. PCT/SE2014/050877, filed on Jul. 8, 2014, which claims the benefit of SE 1400291-9, filed on Jun. 10, 2014, and the benefit of SE 1350856-9, filed on Jul. 9, 2013. The entire contents of each of U.S. application Ser. No. 16/815,985, U.S. application Ser. No. 16/102,914, U.S. application Ser. No. 14/902,706, International Application No. PCT/SE2014/050877, SE 1400291-9, and SE 1350856-9 are hereby expressly incorporated by reference herein.

TECHNICAL FIELD

The disclosure generally relates to the field of mechanical locking systems for floor panels and building panels. The disclosure shows floorboards, locking systems and production methods.

FIELD OF APPLICATION

Embodiments of the present invention are particularly suitable for use in indoor and outdoor floors and walls, which are formed of ceramic or stone material and which are intended to be joined with a mechanical locking system.

The invention may also be used to lock floor panels which are made up of one or more upper layers of wood or wood veneer, decorative laminate, powder based surfaces or decorative plastic material, an intermediate core of wood-fibre-based material or plastic material and preferably a lower balancing layer on the rear side of the core.

Floor panels of solid wood or with a surface layer of cork, linoleum, rubber or soft wear layers, for instance needle felt glued to a board, printed and preferably also varnished surface and floors with hard surfaces such as stone, tile and similar materials bonded to a sheet shaped material are included. Embodiments of the invention may also be used for joining building panels in general which preferably contain a board material for instance wall panels, ceilings, furniture components and similar.

The following description of known technique, problems of known systems and objects and features of the invention will therefore, as a non-restrictive example, be aimed above all at this field of application and in particular at ceramic tiles intended to be mechanically joined to each other vertically and horizontally on all four edges.

Long and short edges are used to simplify the descriptions. The tiles may also be square.

BACKGROUND

Ceramic tiles are one of the major materials used for flooring and wall coverings. The raw materials used to form tiles comprise clay minerals, feldspar and chemical additives required for the shaping process. One common method to produce ceramic tiles uses the following production steps. The raw materials are milled into powder and mixed. Sometimes, water is then added and the ingredients are wet milled. The water is removed using filter pressing followed by spray drying into powder form. The resulting powder is then dry pressed under a very high pressure (about 400 bars) to a tile body with a thickness of 3-10 mm. The tile body is further dried to remove remaining moisture and to stabilize the tile body to a solid homogenous material. One or several layers of glaze, which is a glass like substance, are applied on the tile body by dry or wet methods. The purpose of tile glazing is to protect the tile. The glaze is available in many different colours and designs.

Some glazes may create different textures. The tile is after glazing fired in a furnace or kiln at very high temperatures (1.300° C.). During firing, the glaze particles melt into each other and form a wear resistant layer.

New dry methods have been introduced recently and a tile may be formed by scattering, pressing and firing in a continuous production line with a total production time of about one hour. Large tile blanks may be formed that after firing are divided into individual tiles by for example laser cutting. This new production technology provides improved strengths, flexibility and size tolerances.

Roller screens are often used to create a decorative pattern. The contact nature of the rotary screen-printing has many disadvantages such as breakages and long set-up times. Several tile producers have therefore recently replaced this conventional printing technology with digital ink jet printing technology that offers several advantages mainly related to production flexibility and costs Tiles are generally installed side by side on a surface such as a floor or wall. An adhesive compound is used as a base. After connection to the sub floor or a wall a grout is spread over and between the tiles to further bind the tiles and to fill spaces between adjacent tiles.

The major advantage of a tile-based floor is that the tiles are moister proof and they do not swell and shrink in changed humidity as other floors, for example laminate and wood floors.

Tile floors have several disadvantages compared to laminate and wood floors. One major disadvantage is that conventional tiles have significant dimensional variances in length, width and thickness. However, such production variances are decreasing continuously when new and advanced production methods based on dry forming are introduced and combined with edge trimming. Another major disadvantage is that installation of tiles is labour intensive. Ceramic tiles are very brittle and they break without significant deformation. They must be installed on rather rigid sub floors and the adhesive compound layer may break if the sub floor expands and shrinks. Rather costly and moisture stable sub floor must be used such as cement bonded particleboard and similar.

Floor elements comprising thin stone material are similar to ceramic tiles. They have similar properties and are installed in a similar way.

There is a need for a tile or stone floor and wall system that is simple to install, that may cover large floor areas without expansion joints, that may be easy to disassemble and that may be installed on more cost efficient sub floors that have a higher moisture movement than the ceramic tiles.

DEFINITION OF SOME TERMS

In the following text, the visible surface of the installed floor or wall is called "front side", while the opposite side, facing the sub floor or the wall, is called "rear side". The edge between the front and rear side is called "joint edge".

By "horizontal plane" is meant a plane, which extends parallel to the outer part of the surface layer. Upper and outer parts of an edge define a "vertical plane" perpendicular to the horizontal plane. By "vertical locking" is meant locking parallel to the vertical plane. By "horizontal locking" is meant locking parallel to the horizontal plane.

By "up" is meant towards the front side, by "down" towards the rear side, by "inwardly" mainly horizontally towards an inner and centre part of the tile and by "outwardly" mainly horizontally away from the centre part of the tile.

Related Art and Problems Thereof

Laminate flooring usually comprise a wood based core, an upper decorative surface layer of laminate and lower balancing layer. A laminate surface comprises melamine-impregnated paper. The most common core material is fibreboard with high density and good stability usually called HDF—High Density Fibreboard.

Laminate floor panels of this type are installed floating on a sub floor and joined mechanically by means of so-called mechanical locking systems. These systems comprise locking means, which lock the panels horizontally and vertically. The mechanical locking systems are usually formed by machining of the core of the panel. Alternatively, parts of the locking system may be formed of separate materials, for instance aluminium or HDF, which are integrated with the floor panel, i.e. joined with the floor panel in connection with the manufacture thereof.

The main advantages of floating floors with mechanical locking systems are that they are easy to install. They may also easily be taken up again and used once more at a different location.

It is known that mechanical joining of long edges as well as short edges in the vertical and horizontal direction may be made l several ways. One of the most used methods is the angle-snap method. The long edges are installed by angling. The panel is then displaced in locked position along the long side. The short edges are locked by horizontal snapping. The vertical connection is generally a tongue and a groove. During the horizontal displacement, a strip with a locking element is bent and when the edges are in contact, the strip springs back and a locking element enters a locking groove and locks the panels horizontally. Such a snap connection is complicated since a hammer and a tapping block has to be used to overcome the friction between the long edges and to bend the strip during the snapping action.

Similar locking systems may also be produced with a rigid strip and they are connected with an angling-angling method where both short and long edges are angled into a locked position. Such installation method is difficult to use if the panels are large and heavy.

Recently advance so called fold down locking systems have been introduced that allow a very easy single action installation with an angling action only that locks the long and short edges. A flexible tongue attached to the short edge is used to connect the short edges with a scissor like movement when a long edge is locked with angling.

The majority of all mechanical locking systems used in laminate and wood floorings are formed by rotating diamond tools. Such forming may be made in high speed and with high precision. The locking systems comprise protruding parts such as a tongue for the vertical locking and a strip for the horizontal locking.

Protruding parts are difficult and practically impossible to form in ceramic material especially in thin ceramic tiles that comprise brittle edges. Spaces between the edges provide additional problems since a tongue must extend over a considerable distance from an edge to cover the space between the edges and to enter into a tongue groove of an adjacent edge.

Diamond tools may be used to form the tile edges. However, the production speed is a fraction of the speed that is used to form advanced joint geometries in wood and plastic based materials. Special cooling systems, generally based on water-cooling must be used to form tile and stone material.

Several attempts have been made to improve tile installations by attaching ceramic and stone tiles to a separate sheet shaped material that may be formed with a mechanical locking system comprising protruding parts such that a floating installation similar to laminate floorings may be obtained.

U.S. Pat. No. 8,156,705 describes a tile having at least one coupling member that cooperatively engages a coupling member of an adjacent tile, such that adjacent tiles may be reasonably secured to one another without the use of grout. The tiles are moulded into a synthetic support structure that comprises a conventional mechanical locking system.

US 2011/0113713 describes a method for arranging a tile in a mould, and injecting a polymer into the mould. The injected material mechanically anchors the substrate to the tile. A mechanical locking and a surrounding grout gasket may also be formed.

Attaching tiles to a separate sheet material or a mould is expensive. The floor thickness increases and a moisture stable tile is difficult to combine with wood base sheet material that expands and shrinks when relative humidity varies between dry and wet conditions.

It is known that a locking strip may be formed of a separate material such as aluminium or HDF and that such strip may be clamped in undercut grooves or attached into a horizontally extending groove formed at an edge of a laminate panel by snapping pressing and/or turning. Such systems are described in WO 94/26999 and WO 03/083234 (Valinge Innovation AB). It is also known that several strip parts spaced form each other may be attached to a long side edge in order to obtain further cost savings.

WO 2001075247 describes a locking system for joining sheet shaped flooring elements with tight joints. The floor elements are constituted of solid wood, fibreboard or particleboard. Long edges are locked with conventional locking system comprising a protruding tongue and a protruding strip. The short edges are joined by vertical displacement and by means of a separate vertical assembly joining profile. The short edge comprises an edge geometry, which requires that substantial amounts of the edge material are removed. The locking system is not suitable to install tiles, which are spaced from each other.

WO 03/083234 describes a locking system that comprises a strip and a tongue made of separate material. This system is not suitable to lock tiles with edges that are spaced from each other. The geometry of the locking system is very complicated to produce in ceramic material.

As a summary it may be mentioned that known locking systems are not suitable to connect ceramic tiles having a brittle tile body since the necessary strength and flexibility of protruding portions formed in ceramic material is not sufficient and the geometry of the edges is difficult to produce with moulding or machining of ceramic material.

The above description of various known aspects is the applicant's characterization of such, and is not an admission that any of the above description is considered as prior art.

SUMMARY

An overall objective of embodiments of the present invention is to provide an improved and more cost efficient locking system for primarily floating installation of ceramic and stone tiles which allows that the edges may be locked to each other mechanically with angling, and/or horizontal snapping and/or vertical snapping.

A specific objective is to form a locking system that comprises a very simple joint geometry and minimum amount of separate material attached to a tile and that may be formed with smallest possible machining of the tile edges, preferably without any brittle protruding parts.

Other specific objectives are to provide tiles with an integrated grout material, improved décor properties, to eliminate size tolerances and to provide panels comprising combination of ceramic material and other lighter and more cost efficient materials.

The above objects of embodiments of the invention may be achieved wholly or partly by locking systems and tiles formed according to the disclosure. Embodiments of the invention are evident from the description and drawings.

The invention is based on the insight that vertical and horizontal grooves with a specific geometry may be formed with high precision in edge portions of a thin ceramic or stone tile body and that such grooves may be used as a part of a locking system allowing a mechanical locking.

The invention is also based on a second understanding that separate strip shaped material comprising vertically protruding locking elements and horizontally protruding tongues may be mechanically connected to such groves and that such separate strip shaped materials and grooves may be used to accomplish a strong, cost efficient and simple floating installation of ceramic or stone tiles on a floor or on a wall in indoor or outdoor applications.

The invention is based on a third understanding that the grooves and separate strip shaped material may be formed such that it is possible to overcome the size tolerances off ceramic tiles that generally are installed with a space between the edges and that machining of the upper edges to a pre-determined perfect size may be avoided.

The invention is based on a fourth understanding that pre formed tiles comprising vertical and horizontal grooves may be produced and that such pre formed tiles may reduce the final machining of the edges which is needed to form the required geometry.

Thin ceramic surfaces may also be bonded to materials that are moisture stable and the ceramic surface may be used to form a part of the locking system.

A first aspect of the invention is a set of ceramic or stone tiles comprising a first tile provided with a first edge and a second tile provided with a second edge. The tiles are provided with a locking system for locking the first edge to the second edge in a horizontal direction parallel with a tile surface and in a vertical direction perpendicular to the horizontal direction. The locking system comprises a first and a second tongue and a strip part provided with a first and a second locking element. The first edge is provided with a first horizontal groove and a first vertical groove formed in a body of the first tile. The first locking element is configured to cooperate with the first vertical groove for locking in the horizontal direction and the first tongue is configured to cooperate with the first horizontal groove for locking in the vertical direction. The second edge is provided with a second horizontal groove and a second vertical groove formed in a body of the second tile. The second locking element is configured to cooperate with the second vertical groove for locking in the horizontal direction and the second tongue is configured to cooperate with the second horizontal groove for locking in the vertical direction. Each of the first and the second horizontal groove comprises an upper lip and a lower lip. The lower lip of the first horizontal groove extends horizontally to or is within an upper and outer part of the first edge and the lower lip of the second horizontal groove extends horizontally to or is within an upper and outer part of the second edge. There is a space between the outer and upper part of the first edge and the outer and upper part of the second edge in a locked position of the first and the second edge.

The lower lip of the first horizontal groove may extend horizontally essentially to the upper and outer part of the first edge and the lower lip of the second horizontal groove may extends horizontally essentially to the upper and outer part of the second edge.

The depth of one of the horizontal grooves of the first or the second tile, measured as the horizontal distance from a vertical plane, located at the upper and outer part of the edge, and to the groove bottom, may vary along the same edge of one of the tiles or between the same edges of two different tiles.

The depth of the horizontal groove may vary with at least 0.10 mm.

The strip part may comprise a vertically extending tongue body and a first tongue protruding from the vertically extending tongue body.

The locking system may be configured to be locked by angling and/or vertical snapping and or horizontal snapping of the first and the second tile.

A second aspect of the invention is a set of ceramic or stone tiles, each comprising a first and a second edge which are provided with a locking system for locking in a horizontal direction parallel with a tile surface and in a vertical direction perpendicular to the horizontal direction. The first edge of the first tile is lockable to the second edge of the second tile. The second edge of the first tile is lockable to the first edge of the second tile in a horizontal direction parallel with a tile surface and in a vertical direction perpendicular to the horizontal direction, wherein said locking system comprises a first and a second tongue and a strip part provided with a first and a second locking element. The first edge is provided with a first horizontal groove and a first vertical groove formed in a body of the first and the second tile. The second edge is provided with a second horizontal groove and a second a vertical groove formed in a body of the first and the second tile. The first locking element is configured to cooperate with the first vertical groove for locking in the horizontal direction and the first tongue is configured to cooperate with the first horizontal groove for locking in the vertical direction. The second locking element is configured to cooperate with the second vertical groove for locking in the horizontal direction and the second tongue is configured to cooperate with the second horizontal groove for locking in the vertical direction. Each of the first and the second vertical groove comprises a first groove wall, a second groove wall and an upper surface. The first groove wall of the first vertical groove is closer to the outer part of the first edge than the second groove wall of the first vertical groove. The first groove wall of the second vertical groove is closer to an upper and outer part of the second edge than the second groove wall of the second vertical groove. There is a first a horizontal distance between the first groove wall of the first edge of the first tile and an upper and outer part of the first edge of the first tile. There is a second horizontal distance between the first groove wall of the second edge of the first tile and an upper and outer part of the second edge of the first tile. There is a third horizontal distance between the first groove wall of the first edge of the second tile and an upper and outer part of the first edge of the second tile. There is a fourth horizontal distance between the first groove wall of the second edge of the second tile and an upper and outer part of the second edge of the second tile. The first horizontal distance varies along the first edge of the first tile, and/or the second horizontal distance varies along the second edge of the second tile, and/or the third horizontal distance varies along the first edge of the second tile, and/or the fourth horizontal distance varies along the second edge of the second tile, and/or the first horizontal distance is different from third horizontal distance and/or the second horizontal distance is different from the fourth horizontal distance.

In a locked position of the first and the second edge there may be a space between the upper outer parts of the first and second edge.

Each of the first and the second horizontal groove may comprise an upper lip and a lower lip. The lower lip of the first horizontal groove may extend horizontally to or is within an upper and outer part of the first edge and the lower lip of the second horizontal groove may extends horizontally to or is within an upper and outer part of the second edge.

The strip part may comprise a vertically extending tongue body with a first tongue that protrudes from the vertically extending tongue body.

The locking system may be configured to be locked by angling and/or vertical snapping of the first and the second tile.

A third aspect of the invention is a ceramic tile provided with an embossed surface and a décor. The embossing is in register with the décor. The embossing comprises upper and lower surface portion. An upper surface portion comprises a different gloss level than a lower surface portion.

The décor may be a wood design and the different gloss levels may be formed by a digitally applied powder.

A fourth aspect of the invention is a set of floor panels comprising a first and a second panel comprising a ceramic surface layer and a core comprising thermoplastic material mixed with wood or mineral fillers. A mechanical locking system is formed in the core of the first and the second panel. The mechanical locking system comprises a strip provided with a locking element at a first edge of the first panel and a locking groove at a second edge of the second panel. The locking element and the locking groove are configured to cooperate for locking of the first and the second edge in a horizontal direction parallel with the ceramic surface layer. The mechanical locking system comprises a tongue at the second edge and a tongue groove formed in the first edge. The tongue and the tongue groove are configured to cooperate for locking of the first and the second edge in a vertical direction perpendicular to the horizontal direction. The thickness of the ceramic surface layer is in the range of 2 mm to 5 mm. The tongue groove comprises an upper lip that is essentially formed by the ceramic surface layer.

In a locked position of the first and the second edge there may be a space of about 1-10 mm between the ceramic surface layers.

A fifth aspect of the invention is a pre formed ceramic tile intended to be provided with a locking system. A groove is formed at the rear side of a tile edge.

A first thickness of an outer edge of the pre formed ceramic tile may be lower than a second average thickness of the tile body of the pre formed ceramic tile.

The thickness difference between the first thickness and the second average thickness may be about 1-3 mm.

The groove may be an equalizing groove comprising an upper surface that is essentially parallel with an upper surface of the pre formed ceramic tile. The upper surface may extend from the outer part of the edge and inwardly.

The upper surface of the equalizing groove may extend over a horizontal distance of about 3-20 mm.

The rear side of the pre formed ceramic tile edge may comprises a vertical groove spaced from the outer edge and an equalizing groove extending from the vertical groove and to the outer part of the edge.

A sixth aspect of the invention is a set comprising a first tile, a second tile and a strip part, which preferably comprises a polymer or metal material, wherein said first and second tile are ceramic or stone tiles. A first edge of the first tile or a second edge of the second tile comprises a vertical groove and a horizontal groove formed in a body of the first or the second tile respectively. The strip part is configured to be connected to one of the vertical grooves and one of the horizontal grooves, formed on the same edge, for vertical locking perpendicular to the tile surface and horizontal locking parallel to the tile surface of the first and the second tiles. In locked position there is a space between upper parts of the first and second edge.

Vertical and horizontal grooves may be formed in the first edge of the first tile and the second edge of the second tile. The strip part may be configured to be connected to the horizontal and vertical groves formed in the first edge of the first tile and in the second edge of the second tile.

The horizontal groove of the first edge or the second edge may comprise an upper lip and a lower lip. The lower lip may extend horizontally to or is within an upper and outer part of the respective first or second edge.

The strip part may comprise a tongue having a vertically extending tongue body located in the space.

The tiles may be connected with vertical or horizontal snapping wherein the tongue body is displaced horizontally in the space during locking.

The major advantages of the invention are that a locking system may be formed with a very limited machining of the tile edges and no protruding parts formed in the tile body are needed to accomplish a mechanical locking. The locking system is formed with a geometry that is adapted to the production methods of the tiles and to the possibility to pre form tiles comprising grooves that may be used as a part of the final joint geometry. This will reduce the material that must be removed during the final forming of the edges. The locking system is adapted to position and align tiles with normal size tolerances and generally no machining of the upper parts of the edges is needed. The strip part comprises a simple geometry that may be formed in a cost efficient way by punching or extrusion of a plastic or metal material. The strip part is also formed such that it is easy to factory connect to a tile edge prior to installation or by the installer during installation.

BRIEF DESCRIPTION OF THE DRAWINGS

The disclosure will in the following be described in connection to exemplary embodiments and in greater detail with reference to the appended exemplary drawings, wherein:

FIGS. 3a-3b illustrate floorboards with locking systems according to known technology.

FIGS. 4a-e illustrate a locking system according to an embodiment of the invention.

FIGS. 7a-d illustrate embodiments of strip parts.

FIGS. 13a-13d illustrate embodiments of an installation of tiles, an embossed tile surface and underlay material connected to a tile

FIGS. 21a-21e illustrate an embodiment of a method to eliminate size tolerances.

DETAILED DESCRIPTION OF EMBODIMENTS

To facilitate understanding, several locking systems in the figures are shown schematically.

It should be emphasized that improved or different functions may be achieved using combinations of the embodiments.

All embodiments may be used separately or in combinations. Angles, dimensions, rounded parts, spaces between surfaces etc. are only examples and may be adjusted within the basic principles of the invention.

Figure 1A:
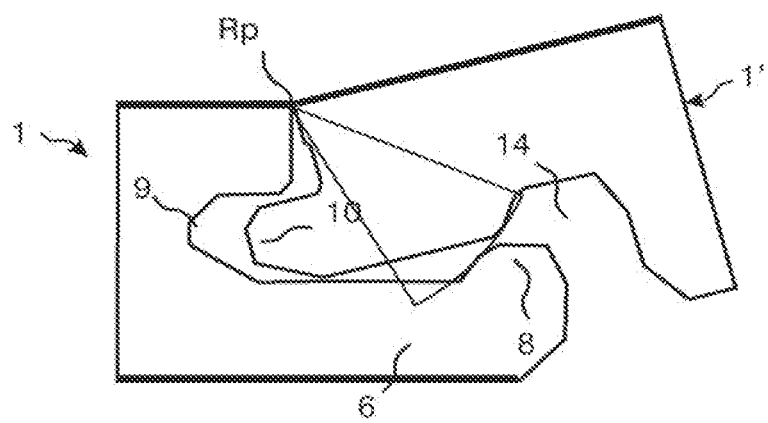
FIGS. 1a-d illustrate locking systems according to known technology.
Figure 1B:
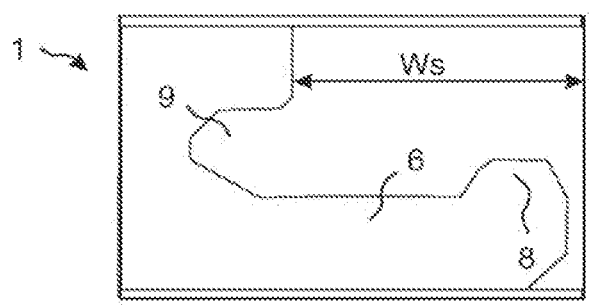

FIGS. 1a and 1b show a known locking system used in laminate and wood floors that are locked with angling. The horizontal locking is obtained by a locking strip 6 with a locking element 8 formed at one panel edge 1 that locks into a locking groove 14 formed in another adjacent panel edge 1'. The forming of the strip 6 creates a waste Ws as shown in FIG. 1b when considerable amounts of material are removed. The locking system comprises protruding parts such as a tongue 10 and a strip 6 that are formed by machining of the panel edge.

Figure 1C:
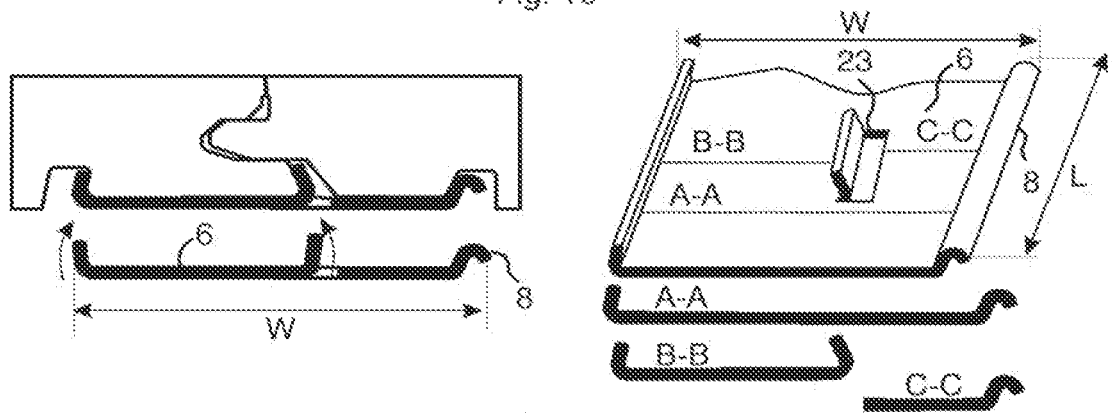

FIG. 1c shows a known locking system used in laminate floors comprising a separate aluminium strip 6 attached to a lower part of a panel edge. A part of the strip 6 is bent around an inwardly inclined vertically extending surface. Such connection of the strip 6 to the panel edge is made in a separate operation than the machining of the edge. The strip comprises three different cross section A-A, B-B and C-C that are used to connect the strip to the panel edge and to lock the panels horizontally. The length L of the strip is the same along the width W. The part of the strip that extends from the edge comprises a small cavity 23, which is formed when a part of the strip body is punched and bent around a panel edge. A protruding tongue made in one piece with the core is used for the vertical connection.

Figure 1D:
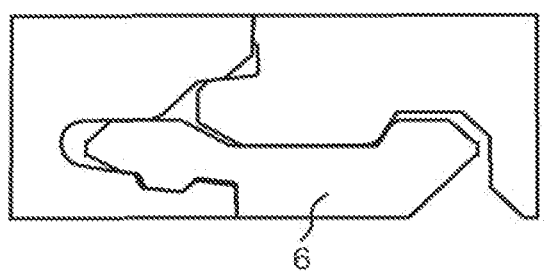

FIG. 1d shows a strip 6, which is attached with snapping into a horizontally extending groove. This strip is formed by machining and has the same cross section along its length.

An advanced edge profile is required to fix the strip to the edge. The locking system may also comprise a separate flexible tongue. Such locking systems suffer from several disadvantages. The material content is high due to the design and only limited material savings may be reached. The fixing of the strip to the edge is rather complicated and slow.

Figure 2A:
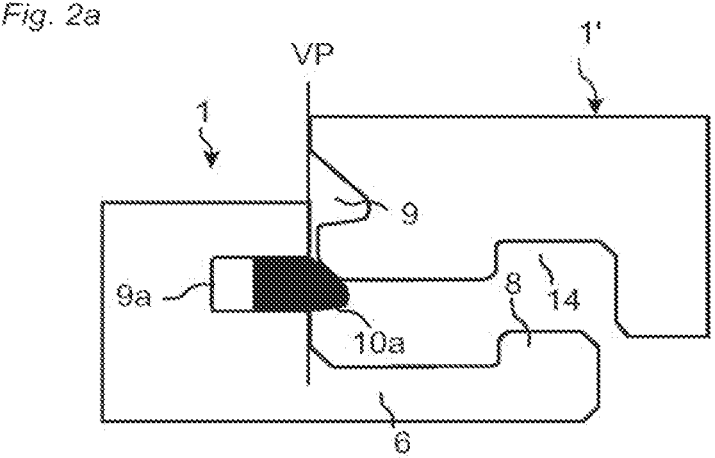
FIGS. 2a-d illustrate displaceable tongues and separate strip parts according to known technology.
Figure 2B:
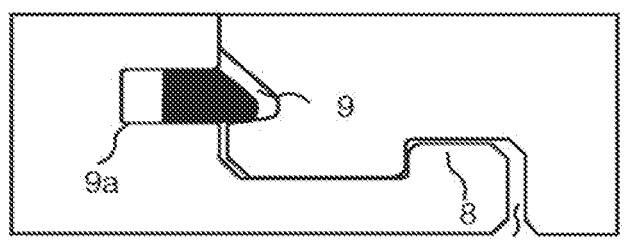

FIG. 2a-2b show a locking system with a separate flexible displaceable tongue 10a inserted in a horizontally extending displacement groove 9a formed on the short edge of a panel. The separate tongue is inserted in high speed and is mainly used to obtain higher flexibility when the panels are locked with a vertical snapping. The locking system may be used to connect tiles. The locking system is difficult to produce in thin ceramic tile material since the protruding strip 6 may break.

Figure 2C:
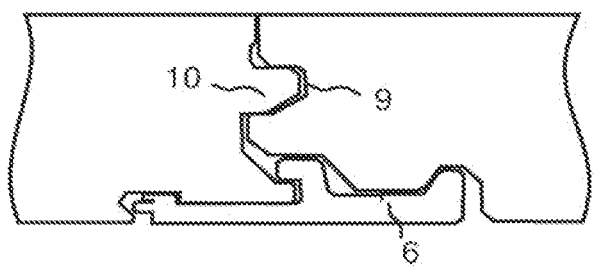
Figure 2D:
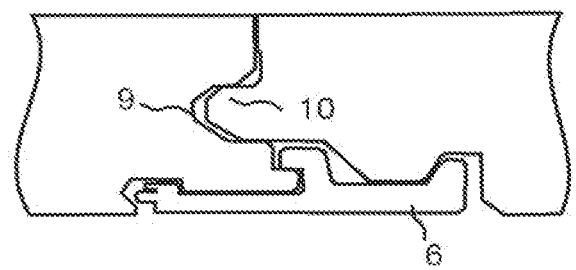

FIGS. 2c and 2d shows locking systems comprising a separate plastic strip part 6 that may be connected to a tile edge. This locking system is also difficult to produce in ceramic and stone material since a lot of material must be removed by rotating tools. The protruding tongue 10 is brittle and may crack.

FIG. 3a shows a known conventional panel with a strip 6 that extends along the whole long edge. Material savings may be increased if several strip parts 6 are connected on a long side of a panel as shown in FIG. 3b.

One of the basic principles of the invention is the understanding that simple grooves may be formed in the tile body and that such grooves may be used to connect separate materials comprising protruding parts and to form locking system allowing a strong mechanical locking in a floating manner.

FIGS. 4a-4d show a locking system according to one embodiment of the invention that may be connected with angling, vertical snapping and horizontal snapping. The locking system may also be unlocked with angling and sliding along the edge. FIGS. 4a, 4b and 4c are side views and FIGS. 4d and 4e are top views.

FIG. 4a shows two adjacent edges 1, 1' of a first 1a and a second 1b tile. Each tile 1a, 1b comprises a first horizontal groove 9a formed in the first edge 1, a second horizontal groove 9b formed in the second edge 1', a first vertical groove 14a formed in the first edge 1 and a second vertical groove 14b formed in the second edge 1' and a strip part 6 connected mechanically to the first horizontal 9a and vertical 14a grooves.

The horizontal grooves 9a, 9b are formed in the outer vertical portion of tile edge. FIG. 4b show that the horizontal grooves 9a, 9b comprise a horizontal grove opening 17 at a vertical plane VP located at the upper and outer part of the tile edge, an upper lip 12 a lower lip 11, an upper groove wall 18 a lower groove wall 19 and a groove bottom 20. The vertically grooves 14a, 14b are formed at the rear side of the tile and are spaced from the outer edges. The vertical grooves 14a, 14b comprise a vertical groove opening pointing 23 downwards, with a first 24 and a second 25 groove wall and an inner groove wall 25 located at the upper part of the vertical grooves 14a, 14b. The first 24 groove wall is located closer to the vertical plane VP than the second groove wall 25.

The strip part 6 is according to the invention preferably used to lock the edges 1,1' horizontally inwardly and outwardly and vertically upwards and downwards. The upper edges are preferably connected to each other with a pre-determined horizontal space S.

This is a major difference compared to conventional technology where the upper edges are locked in contact with each other and the strip part 6 is only used to preventing horizontal separation. The space S may be used to form a specific locking system with a favorable geometry and function as described below. Angling and snapping properties may be improved and the locking system may be formed with a more cost efficient geometry.

The locking system comprises a strip part 6 having a strip body 7 and upwardly extending first 8a and a second 8b locking element at opposite and outer part of the strip body 7. An upper part of the second locking element 8b comprises preferably an upper guiding surface 22 that is used to guide the locking element 8b into the second vertical groove 14b during angling, horizontal snapping and vertical locking.

The strip body 7 comprises a first 10a and a second 10b upwardly extending flexible tongue. The tongues 10a, 10b have preferably a vertically extending flexible tongue body 30, an upper sliding surface 31 that may be flexible and a tongue locking surface 32.

The tongue body 30 is preferably at least partly located in the space S formed by the adjacent edges. Such a locking system provides the advantage that no material has to be removed from the edge in order to accommodate a vertically extending tongue body 30.

The space S may also be used to allow the tongue body 30 to be displaced horizontally in the space S during vertical and/or horizontal snapping.

The strip part 6 is configured to be locked to the first edge 1 by the first tongue 10a that is inserted into the first horizontal groove 9a and by the first locking element 8a that is inserted into the first vertical groove 14a. The strip body 7 comprises preferably a fixing element 16 at an outer part that may be used in some embodiments to obtain a firm connection of the strip part 6 to the tile. The fixing element may be flexible and may lock against the second groove wall 25.

The locking elements 8a, 8b cooperate with the vertical grooves 14a, 14b and locks the edges 1, 1' in a horizontal direction and prevents horizontal separation. The flexible tongues 10a, 10b cooperate with the horizontal grooves 9a, 9b and locks the edges 1, 1' vertically and prevents horizontal displacement of the panel edges towards each other.

Other parts formed on the strip body may be used to prevent such horizontal displacement of the panels towards each other.

Tile and stone material may be formed by rotating hard metal or diamond tools. Even stationary carving, scraping or grinding tools may be used.

Test production shows that small grooves may be formed in a cost efficient way with rotating diamond tools and that such grooves may have sufficient strength even in brittle materials such as ceramic or stone material if the material content adjacent to the groove is sufficient in relation to the groove width and depth. A joint geometry with high strengths may be obtained if the edge preferably only comprises very small parts or even more preferably no parts that extend horizontally beyond the upper edge.

The locking system according to the invention has preferably no protruding parts such as a tongue or a strip that are formed in the tile body and that protrudes beyond the upper edge.

Rather small grooves that extend inwardly for example 0.5-2 mm into an edge or at a rear side may be formed and such grooves may have sufficient strength even in thin and brittle ceramic and stone materials. Preferably there are no or only very small protruding parts extending beyond the upper edge, especially if such protruding parts are formed by machining of the tile edges.

A strong edge groove with for example 2 mm debt may be formed in high speed with five rotating tools where each tool removes about 0.4 mm of material. The forming may be made when a tile is displaced in relation to rotating tools. The tile may also be connected to a stationary holder and the tools are displaced in one or several machining steps in relation to the tile edge.

It is an advantage if no material or very small amounts of material are removed at the upper part of the edges, especially if such edges are formed with bevels or rounded parts.

Tiles are general not completely square or rectangular and one edge may have a different length than another edge. Two edges that meet each other may not be completely perpendicular.

Such production tolerances are generally eliminated by the spaces between the edges that are filled with grout material. It is a major advantage if the locking system is formed and configured such that the tiles are installed and aligned with a pre-determined average distance between the edges and that the distance deviations are minimized. Preferably the horizontal grooves are formed more precisely than the upper edges. This means that the depth of one or several horizontal grooves, measured as the horizontal distance from a vertical plane located at the upper and outer part of a tile edge and to the inner surface a horizontal groove, may vary along the edge. The groove depth of a horizontal groove may be at least 0.10 mm or even 0.20 mm larger at one part of the edge than at another part of the same edge. The horizontal groove at all four edges of a tile may be formed with smaller tolerances the upper edges. For example a set of tiles according to the invention may have long edges of 40.0+−0.2 mm and short edges of 30.0+−0.2 mm measured at the upper parts of the tile. The distance between the inner surfaces of the horizontal grooves may be 36.0+−0.10 mm and 26.0+−0.10 mm when 2 mm deep grooves are formed in the edge.

The locking system according to the invention will align all tiles automatically in a pre-determined position vertically and horizontally. This allows that the space S between the tiles may be decreased compared to conventional installation. A space S of 2-3 mm may be sufficient and such a small space may be used to decrease the amount of grout material.

The grooves are preferably formed in the tile body with rotating diamond tools in a separate production step after the production of the tile. The grooves may also be formed in two steps. The first step may be a rough forming that is formed during the tile production. The second step is the final forming with diamond tools. This two-step forming may be used to reduce the amount of material that must be removed in order to obtain a joint geometry that is needed for a high quality locking system that guides the tiles into a correct position vertically and horizontally during installation.

New and advanced production methods to produce tiles are under development and such methods will make it possible to produce grooves with sufficient accuracy in line with the tile production. No further machining or forming may be needed to form a locking system.

The strip part 6 may be formed from metal material, preferably from steel or aluminium.

The strip part 6 is in this embodiment formed by punching and pressing.

FIG. 4d shows that the flexible tongues may 10a, 10b may be spaced from each other in the length direction of the tile edge. The material, which is needed to form a tongue 10, is obtained from the strip body. A cavity 59 is formed when the tongue is formed by punching a metal sheet. A cavity is in this embodiment formed between the first tongue 10a and the second locking element 8b.

Figure 5A:
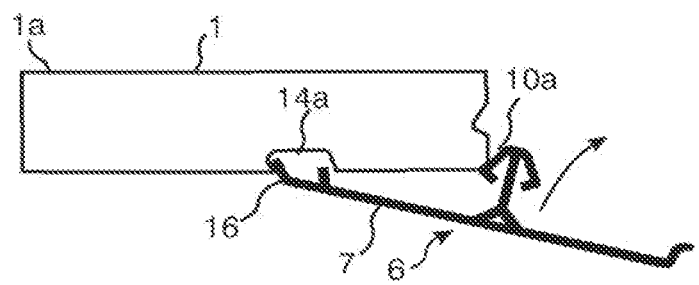
FIGS. 5a-f illustrate a method to fix the strip part to an edge according to an embodiment of the invention and locking with angling and snapping.

FIGS. 5a-5e show a method to fix a strip part 6, as described in FIGS. 4a-4e, to an edge of a tile or stone material. The strip may be angled and snapped into the edge from the rear side as shown in FIG. 5a whereby the flexible tongue 10a is bended and/or compressed. Alternatively the strip may be inserted along the edge from one of the tile corners or the tongue 10a may be inserted in the groove 9a and the locking element 8a may be pressed into the vertical groove 14a as shown in FIG. 16d.

Figure 5B:
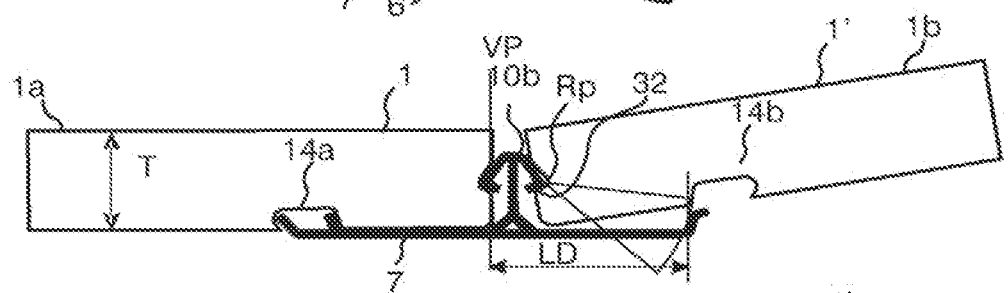
Figure 5C:
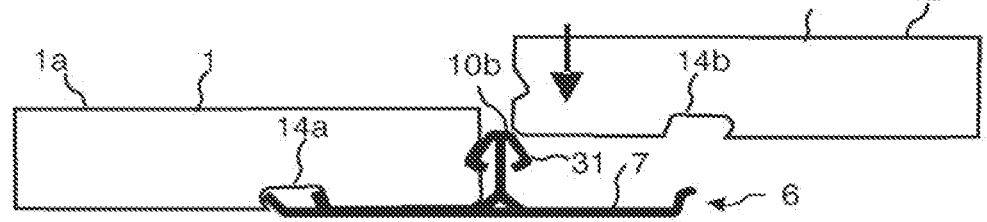
Figure 5D:
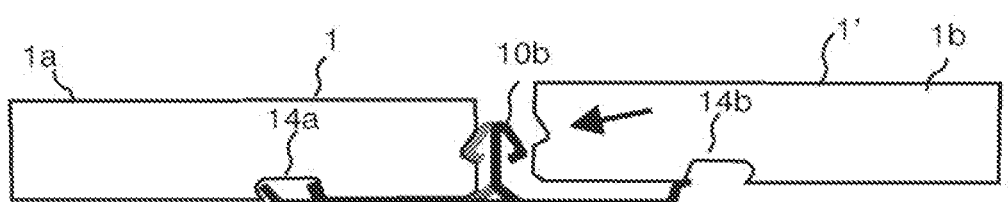
Figure 5E:
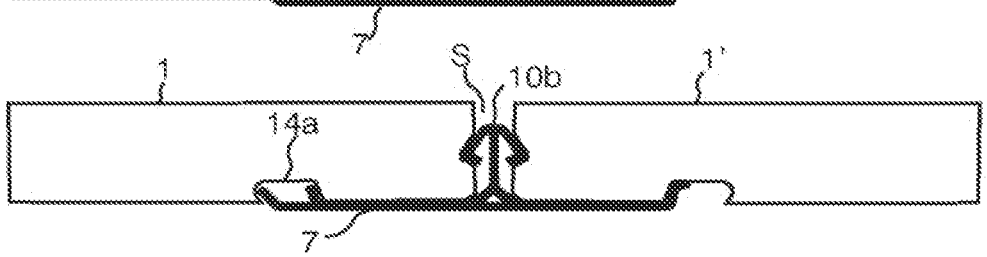
Figure 5F:
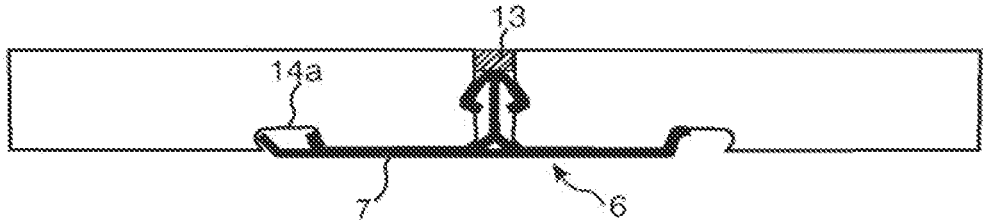

FIG. 5b shows a connection with angling of the second edge 1' against the first edge 1. The first edge 1 may also be angled against the second edge 1' with the strip body 7 inserted under the second edge prior to angling. FIG. 5c shows vertical snapping and FIG. 5d horizontal snapping. FIG. 5e shows two connected edges with a space S between upper edges and FIG. 5f shows a grout material 13 applied in the space S that may be a flexible polyurethane material.

FIG. 5b shows that the angling may take place around a rotation point Rp that is located at the tongue locking surface 32 below the upper part of the tongue. This allows that a locking element 8 may be formed with a high locking angle and may be combined with a locking distance LD, defined as the horizontal distance from the vertical plane and to the locking element, which may be 1-1.5 times the tile thickness T or even smaller for example 0.5-1.0 times the tile thickness T. The advantage is that a strong locking system may be formed with a compact strip part and less material will be needed to form the locking system.

A tile 1a with an edge 1 comprising a strip part 6 that is attached prior to installation, as shown in FIG. 5c, is referred to as a "strip tile" A tile 1b with an edge that is connected to the strip tile 1a with vertical folding or vertical displacement is referred to as a "fold tile"

A flexible tongue that may be used to connect the edges with a vertical displacement may have flexible protrusions in its inner or outer parts. The flexible tongue may also comprise a snap tab at its outer end. All separate flexible tongues described in this disclosure may be connected to the strip tile 1a or to the fold tile 1b.

The strip part 6 is preferably connected to the edge mechanically. Glue may also be used and may be combined with a mechanical connection.

The strip part 6 may be a plastic or metal section. Flexible or rigid tongues may be formed as punched, extruded or injection moulded plastic or metal components.

The strip part may comprise vertically protruding blocking elements that prevents a horizontal displacement of the edges towards each other.

Figure 6A:
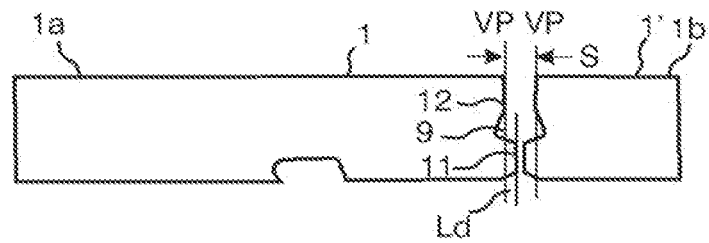
FIGS. 6a-e illustrate alternative embodiments of the invention.
Figure 6B:
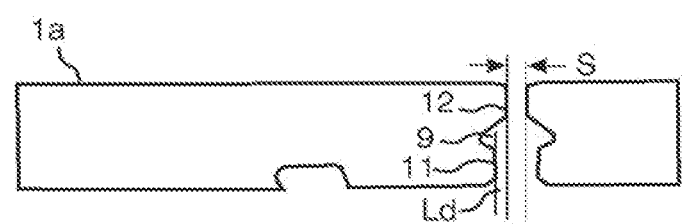

FIG. 6a shows that the horizontal groove 9 may comprise a lower lip 11 that extends horizontally beyond the upper edge and the vertical plane VP or that is locate inwardly spaced from the vertical plane VP with a horizontal distance to the upper edge as shown in FIG. 6b. Preferably the lip distance Ld, defined as the horizontal distance from the outer part of the lower lip 11 and to the vertical plane VP, is less than 0.5 times the space S between two adjacent tile edges when a lower lip extends beyond the vertical plane VP as shown in FIG. 6a. The lip distance is preferably less than the space S between upper adjacent edges when the lower lip 11 is displaced inwardly in relation to the vertical plane VP as shown in FIG. 6b. Such locking systems may be formed in a cost efficient way and limited amounts of materials have to be removed.

Figure 6C:
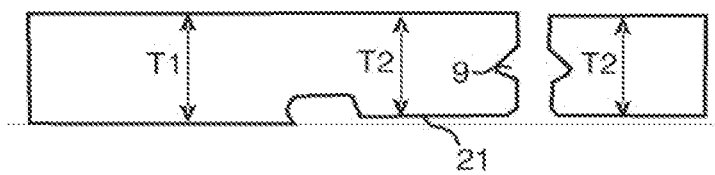

FIG. 6c shows that the edge may also comprise an equalizing groove 21 that reduces the average thickness of a tile T1 to a smaller thickness T2 at an edge portion and allows that a strip part with a thick strip body may be connected to a tile edge. The equalizing groove may also be used to reduce thickness tolerance between adjacent tile edges.

Figure 6D:
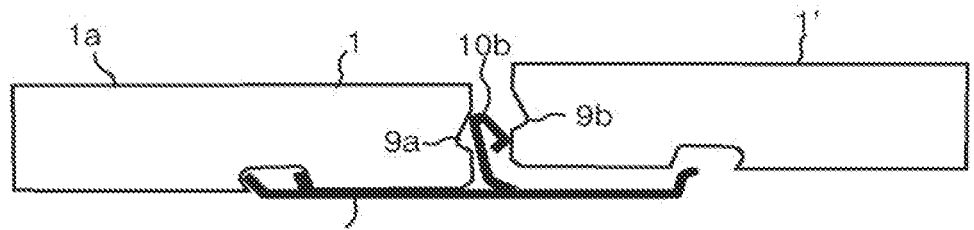

FIG. 6d shows that a part of the tongue 6b may be bended away from the edge 1' and partly displaced into an adjacent horizontal groove 9a during vertical folding.

The strip body may be made of about 0.3-0.6 mm thick metal sheet material preferably a stainless steel material. A more preferred thickness is about 0.3-0.4 mm.

Figure 6E:
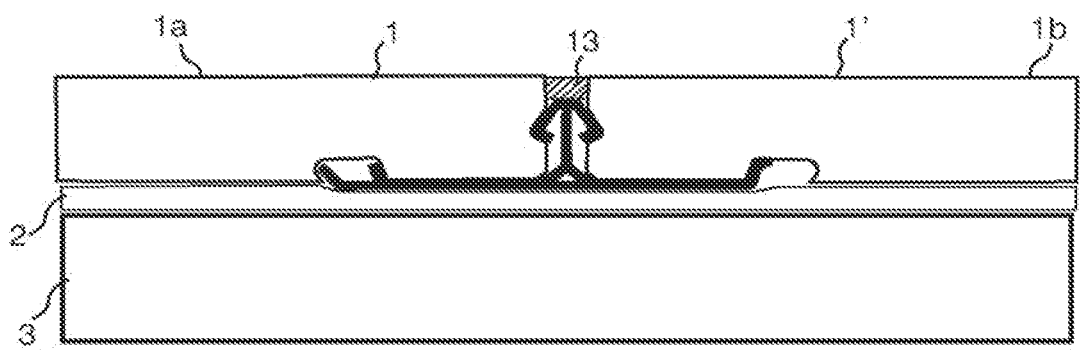

FIG. 6e shows that the thickness of the metal strip part may be such that an underlay 2 such as a foam may be used to overbridge the thickness of the strip body 7 when the tiles are installed on a sub floor 3.

A flexible grout material 13 may be factory connected to two edges that meet each other in a corner section of the tile.

The sub floor 3 may comprise panels with a mechanical locking system on long and short edges.

FIGS. 7a-7d show embodiments of the strip part 6 that may be a metal part (FIG. 7a), an extruded metal or plastic section (FIG. 7b) or an extruded and machined plastic or metal section (FIG. 7c) where parts have been removed in order to provide increased flexibility of the flexible tongues 10a, 10b. The strip parts 6 may also be formed by injection moulding.

A locking with a vertical displacement may be made with less resistance if the flexible tongue 10a may be bended and displaced horizontally for example 1-2 mm during locking. FIG. 7d shows a flexible tongue 10b comprising a flexible tongue body 30 and a flexible sliding surface 31. The flexible tongue 10b is bended and the sliding surface 31 is bended and compressed inwardly during locking.

The edges may be formed such that a part of the tongue 10b may be displaced into one of the horizontal grooves 9a and then towards its locked position into the other adjacent groove 9b as shown in FIG. 6d.

Figure 8:
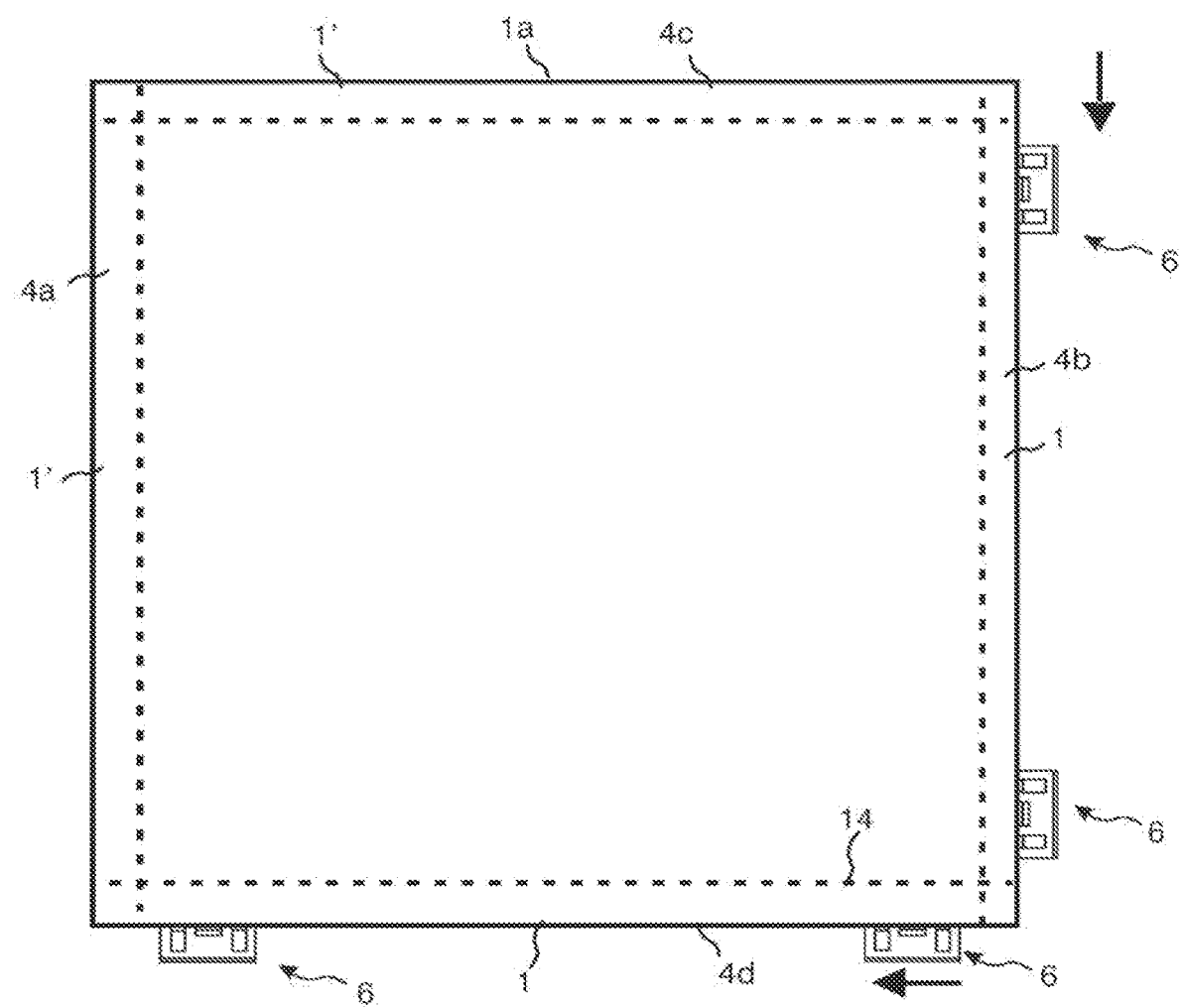
FIG. 8 illustrates an embodiment of a tile with four strip parts.

FIG. 8 shows a tile 1a with 4 strip parts 6 connected to two edges 4b, 4d. The strip parts may be attached by snapping or insertion along the edge.

The strip parts may be factory connected to the tile edge or supplied as individual component that is attached to a tile edge prior to installation. Strip parts 6 may be formed and adapted to a space S between the edges that may vary from 0-10 mm and this may be used to create different grout widths. The vertical 14 and horizontal grooves 9 may extend from along the whole edge 1 or they may only be formed in a part of the edge 1.

Several strip parts may be connected to an edge. The strip parts may have different geometries on different edges or on the same edge. The edge may also comprise one strip part that extends along essentially the whole edge.

It is obvious from the drawings that a first edge 1 of a first tile 1a may be connected to a second edge 1' of a second tile 1b and that a second edge of a first tile 1a may be connected to a first edge of a second tile 1b.

Figure 9A:
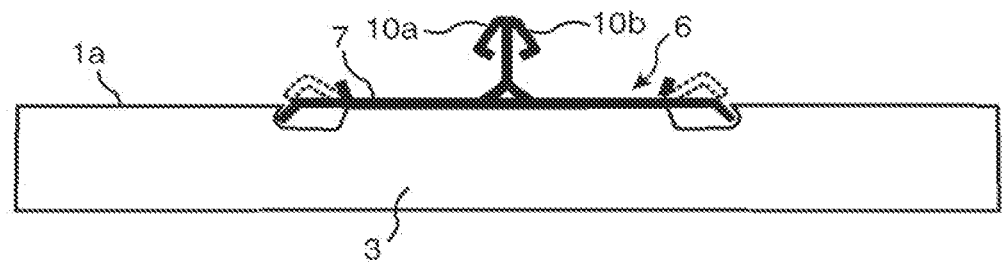
FIGS. 9a-d illustrate embodiments of a sub floor panel with edges comprising a mechanical locking system, a tile connected mechanically to a panel and forming of edge portions
Figure 9B:
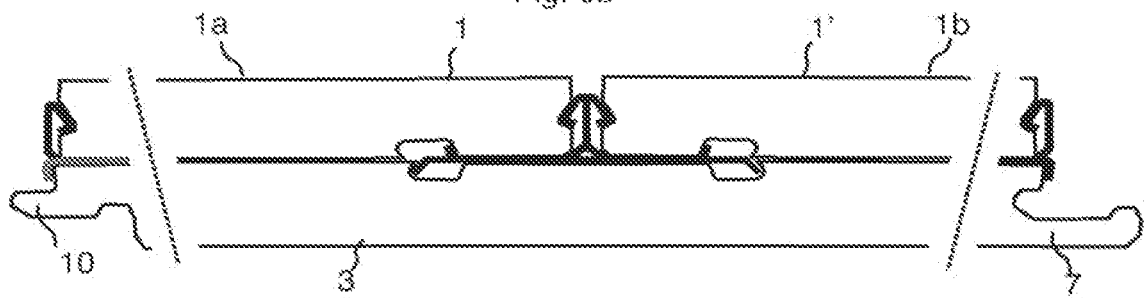

FIG. 9a shows that a strip part 6 may be connected to a panel that may be used as a sub floor 3. The connection may be made mechanically, preferably by bending some parts of the strip body 7 into grooves formed in the sub floor panel. FIG. 9b shows that one or several tiles 1a, 1b may be mechanically connected to the sub floor pane 3 that may comprise a conventional mechanical locking system, for example a locking system shown in FIGS. 1a and 2a. One or several tiles may be installed mechanically by connecting the sub floor panels 3 to each other.

The advantage is that the tiles are mechanically connected to the sub floor panel without glue. The mechanical connection and the flexible tongues allow that the moisture stable tiles 1, 1' and a moisture sensitive sub floor 3 may move independently relative each other when the relative humidity changes from dry to wet conditions. This makes it possible to use sub floors comprising for example wood based materials such as HDF and particleboard that expand and shrink when relative humidity is changing.

All embodiments of the invention may be used to connect tiles for forming a floating floor or to connect tiles in vertical application on a wall. The strip part may be nailed to a vertical sheet material forming a part of a wall system.

Ceramic tiles produced with dry pressing of powder under high pressure may be formed with a thickness of about 2-5 mm and with high flexibility and strength.

Figure 9C:
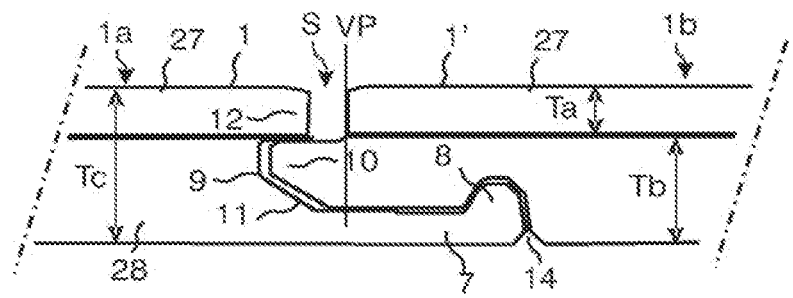

FIG. 9c shows that such thin tiles may be used as a ceramic surface layer 27 in floor panels 1a, 1b comprising a moisture stable core material 28 such as for example mineral or fibre-cement board or a board comprising a mix of thermoplastic material, for example PVC, PE or PP and mineral fillers, similar to so called LVT material, or such thermoplastic material and wood fibre fillers similar to so called WPC material. Preferably fillers constitute about at least 50% of the weight of a core comprising thermoplastic material.

Ceramic material 27 with a preferred thickness Ta of about 2-5 mm, or 2-4 mm or 2-3 mm may be bonded to such moisture stable core material 28. Preferably the thickness Tb of the core is about 3-5 mm or 3-4 mm. A two layer material with a total thickness Tc of for example 5-10 mm may be formed. Preferably the thickness Tb of the core 28 is larger than the thickness Ta of the ceramic surface layer 27.

A locking system comprising a tongue 10 and a tongue groove 9 for vertical locking and a strip 7 with a locking element 8 that cooperates with a locking groove 14 formed in an adjacent edge for horizontal locking may be formed in the core material 28. Preferably the upper lip 12 of the tongue groove 9 comprises essentially ceramic material that provides the strength and prevents vertical displacement of the tongue 10. Preferably at least 60% or at least 80% of the thickness of the upper lip 12 comprises ceramic material. Preferably the upper edges are spaced from each other with a pre-determined space S that is formed when the locking element 8 enters into the locking groove 14 during installation.

Cooperating surface of the locking element 8 and the locking groove 14 may be used to prevent separation of the panel edges away from each other and displacement of the panel edge towards each other. Cooperating surfaces of the tongue 10 and the tongue groove 9 may also be used to create a pre-determined space S and to prevent displacement of the panel edges towards each other.

Figure 9D:
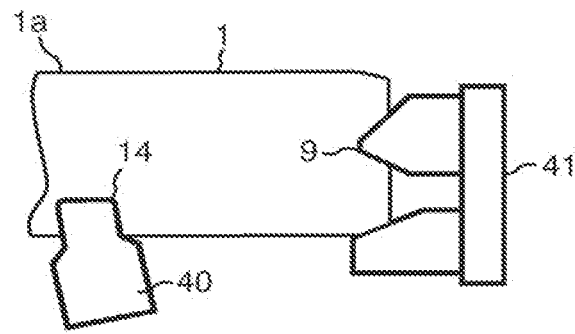

FIG. 9d show that the horizontal groove 9 may be formed by a horizontally rotating tool 41 and that the vertical groove 14 may be formed by a vertically rotating tool 40.

Figure 10A:
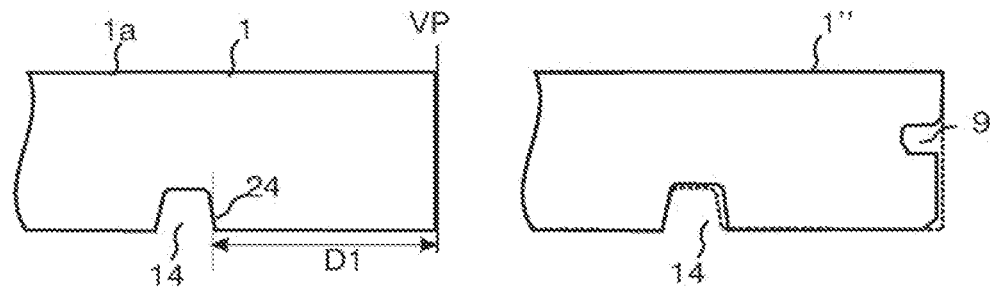
FIGS. 10a-10e illustrate embodiments of pre formed tiles.

FIGS. 10a-10e show that pre formed tiles 1a may be produced comprising a part of the locking system. The pre forming is made preferably prior to the production step when the tile is fired in a furnace or kiln. Grooves may be formed in a very cost efficient way during pressing of the powder material and after the pressing step when the tile body is still soft and very easy to form by for example rotating tools. Grooves may extend along the whole edge or along a part of an edge and they may be formed on one edge or on several edges, preferably on one pair of opposite edges. FIG. 10a shows a pre formed tile edge 1 comprising a vertical groove 14. The horizontal distance D1 from the vertical plane VP and to a first groove wall 24 is preferably about 3-20 mm or even more preferably 5-15 mm.

Figure 10B:
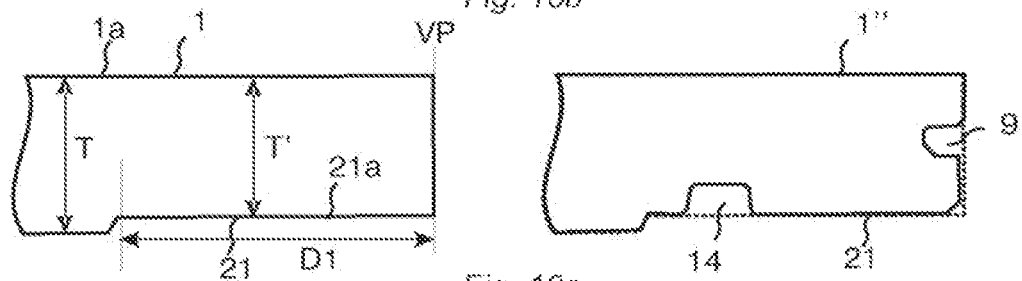
Figure 10C:
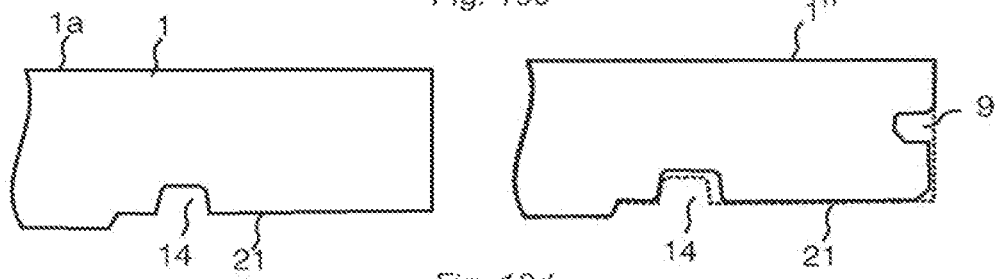
Figure 10D:
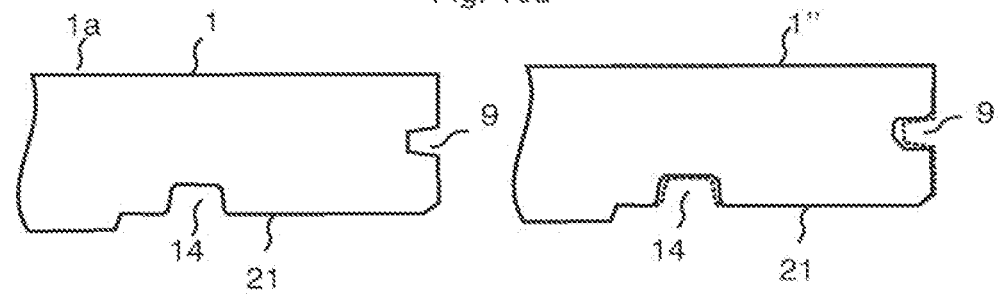
Figure 10E:
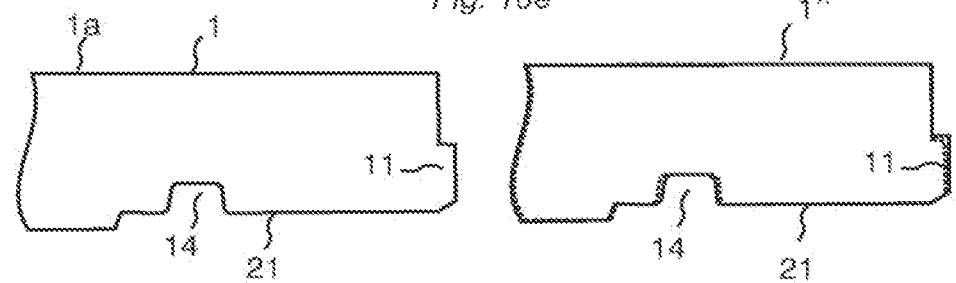

The final shape may be formed by for example rotating tools that form a tile edge 1" comprising a vertical 14 and horizontal 9 groove adapted to the shape of the strip part and the defined geometry of a specific locking system. FIG. 10b shows a pre formed tile 1 comprising an edge with a thickness T' that is smaller, preferably about 1-3 mm smaller, than the average thickness T of the tile body. The edge comprises an equalizing groove 21 with an upper surface 21a that is essentially parallel with the upper surface of the tile and that preferably extends from the vertical plane VP and inwardly over a horizontal distance D1 of preferably 5-25 mm. FIG. 10c shows a pre formed tile comprising a vertical 14 groove and an equalizing groove 21 and FIG. 10d shows a pre formed tile comprising a vertical groove 14, an equalizing groove 21 and a horizontal groove 9. FIG. 10e shows that a protruding lower lip may be pre formed and may be used to connect a strip part. Pre forming may be used to reduce the material content that must be removed to form the edge geometry. The advantage is increased production speed and less tool wear.

Figure 11A:
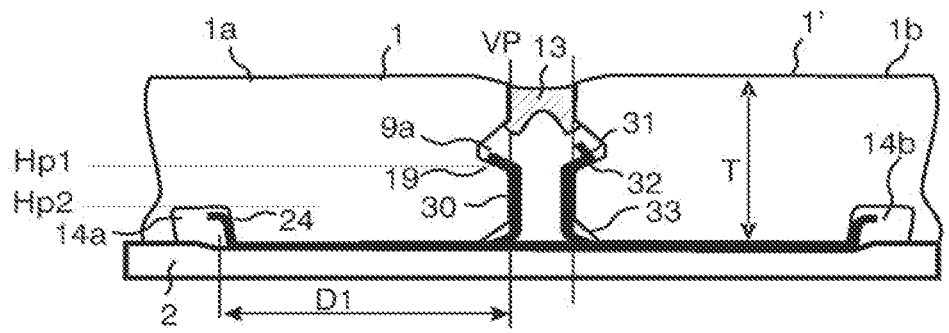
FIGS. 11a-11d illustrate an alternative embodiment of the invention

FIG. 11a shows a second embodiment of the invention. The flexible tongue comprises a vertically extending tile body 30 with a tongue locking surface 32 and an upper part formed as sliding surface 31 above the locking surface 32.

Figure 11B:
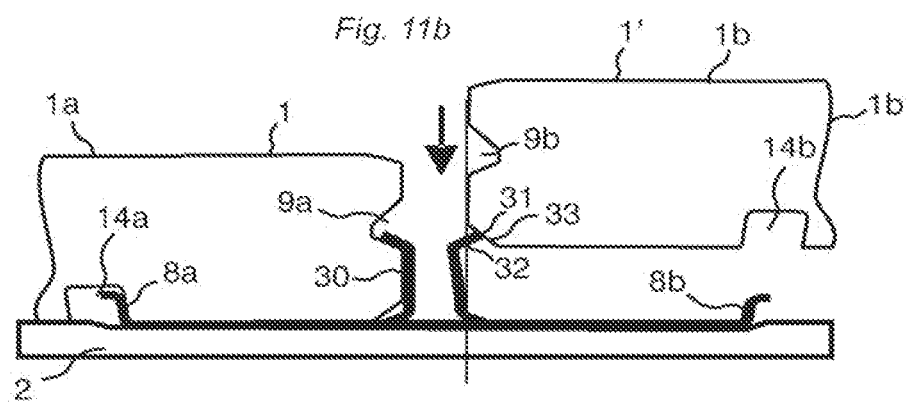

FIG. 11b shows that the outer part of the tongue locking surface may be used as a sliding surface 31 that during vertical displacement cooperates with a tile sliding surface 33 formed at the outer and lower part of the tile edge. The sliding surface 31 of the tongue may be rather small due to the fact that ceramic material is hard and allows sliding against rather small and sharp surfaces. The locking system may also be locked with angling and horizontal snapping.

The lower wall 19 of the horizontal groove 9a is located at a first upper horizontal plane H1 that is closer to the tile surface than a second and lower horizontal plane H2 that intersects the upper surface 26 of the vertical groove 14a. The vertical distance between the first H1 and the second H2 horizontal plane is preferably at least 0.1 times the tile thickness T. The horizontal distance D1 between the vertical plane VP and the first groove wall 24 of the vertical groove 14 is preferably about the same as the tile thickness T or larger.

Figure 11C:
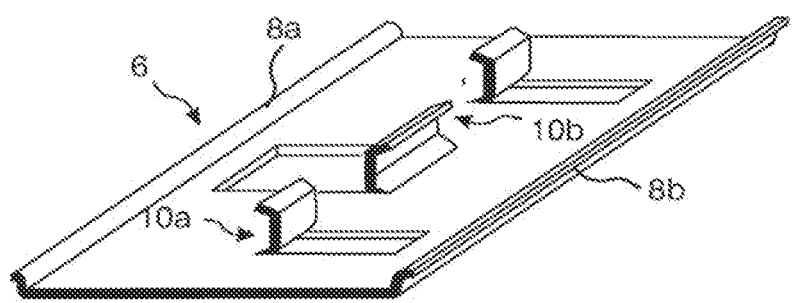

This embodiment offers the advantage that a strong edge portion may be formed in tile material and that the strip part 6 may be formed in a more cost efficient way with a simple punching operation as shown in FIG. 11c.

Figure 11D:
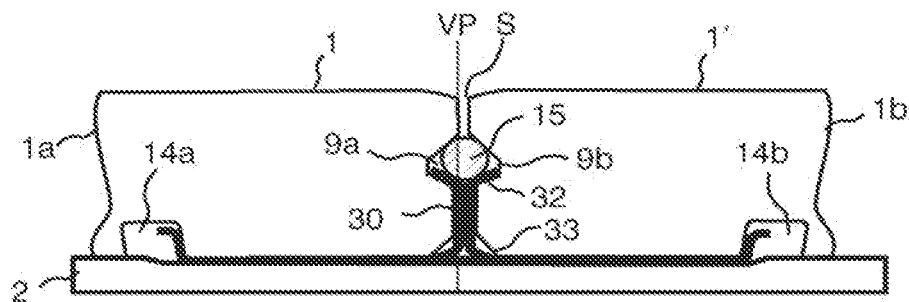

FIG. 11a shows a flexible gout material 13 formed as a flexible strip that is inserted after installation between the upper edges. FIG. 11d shows a flexible material that prior to installation of a second tile is located between the edges, preferably at least partly in the horizontal grooves 9a, 9b and that may be used as an edge sealing 15. Such edge sealing 15 may be used when the tiles are installed with a small space S that may be a small as for example less than 1.0 mm FIG. 12a-12d shows another embodiment of the invention. Tiles are generally produced with considerable thickness tolerances, which are much larger than the tolerances which are acceptable in for example laminate floors connected with tight edges. Such comparatively large tolerances are acceptable since tiles are often produced with beveled edges and installed with a distance filled with grout material. Conventional tiles may also be pressed down into the adhesive compound material in order to adjust thickness tolerances.

Figure 12A:
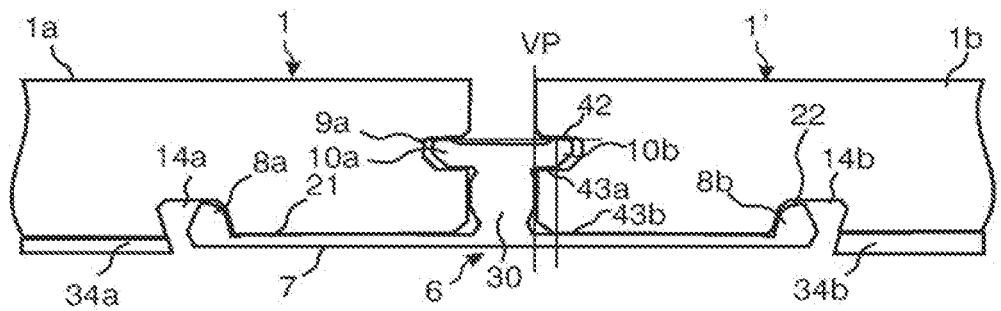
FIGS. 12a-12e illustrate an alternative embodiment of the invention
Figure 12B:
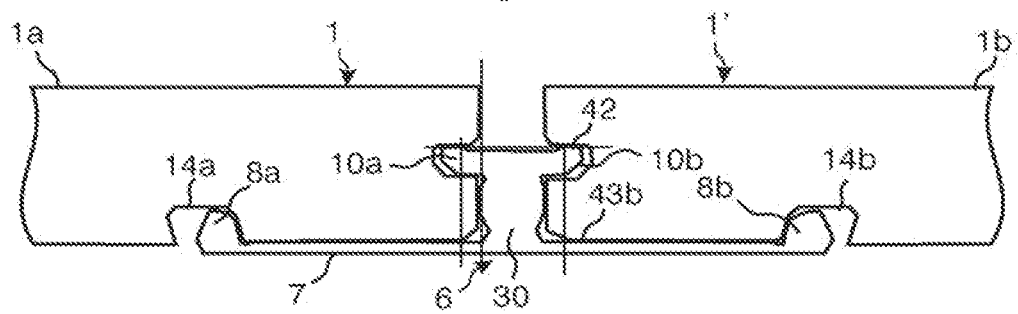
Figure 12C:
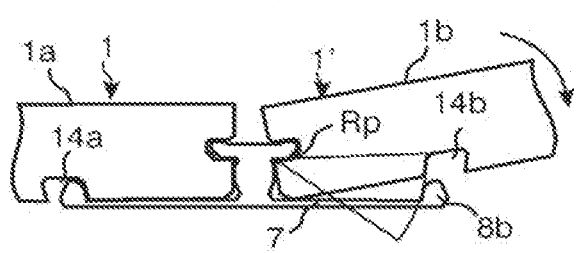

When tiles are installed floating on a foam material thickens tolerances will be visible. The locking system is preferably formed with the rear side as the reference side. High quality tiles have already sufficient thickness tolerances to allow a high quality installation with a mechanical locking system. The thickness tolerance may be improved and this allows that the space S between tiles may be decreased considerably to about 1 mm and that tiles may be formed without beveled edges. Further improvement may be obtained if filler layers 34a, 34b are applied on the rear side of the tile as shown in FIG. 12a, preferably after the firing in the furnace. One embodiment of the invention is a tile comprising a ceramic tile body and a filler 34a, 34b at the rear side. The filler is used to reduce thickness tolerances. Thicker tiles 1 may have a thinner filler layer 33a and thinner tiles may have a thicker filler layer 34b. Fillers make it possible to reduce thickness tolerances from about 1 mm to 0.1-0.2 mm. A part of the filler layer 33 may be formed as an equalizing groove 21 that may be used to house a portion of the strip part 7. The filler may comprise thermoplastic or mineral based material that preferably is moisture proof. The filler 34 may be used to eliminate thickness tolerance even in tiles without a mechanical locking system The strip part 6 in this embodiment of the invention is preferably formed as an extruded plastic or metal section that is preferably used to connect adjacent tile edges with angling and/or horizontal snapping. The strip body 7 comprises a vertically extending tongue body 30 and two horizontally protruding tongues 10a and 10b connected to the tongue body 30. The tongue body and the protruding tongues may or may not be flexible. One of the protruding tongues 10b comprises preferably upper 42 and lower 43a contact surfaces that prevent vertical separation and tat are displaced horizontally in relation to each other such that the lower contact surface 43a is closer to the vertical plane VP than the upper contact surface 42. Such geometry facilitates an easy angling and the rotation point Rp may be located under the protruding tongue 10b as shown in FIG. 12c. FIG. 12b shows that a lower contact surface 43b preventing vertical separation may also be formed between a lower part of tile and the strip body 7.

Figure 12D:
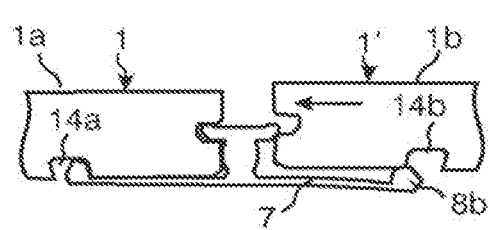
Figure 12E:
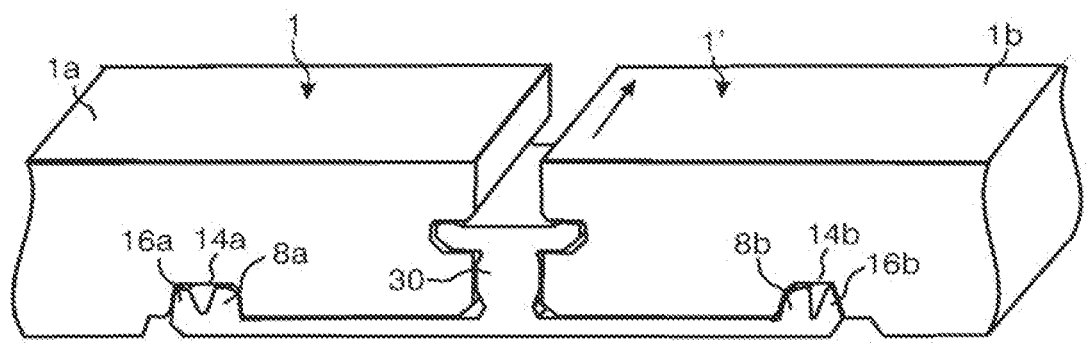

FIG. 12d shows that the locking system may be installed with horizontal snapping. The protruding part of the strip body is bended downwards and the locking element 8b snaps into the vertical groove 14b FIG. 12e shows that the locking elements 8a, 8b may comprise flexible fixing elements 16a, 16b that creates a friction force between the horizontal grooves 14a, 14b and the locking elements 8a, 8b and prevent displacement of two adjacent edges 1, 1' along the edges. Such locking system may be formed at two adjacent edges, for example the long edges, and may be used to prevent separation of the other two pair of edges, for example the sort edges, since the friction between the strip part 6 and the tiles 1. 1' prevents mutual displacement. The strip part may of course also be glued to the edge of one of the tiles 1a.

FIG. 13a shows a tile 1a made of ceramic material comprising one pair of opposite long edges 4a, 4b and one pair of opposite short edges 4c, 4d. The tile may be a plank shaped panel with a length of for example 0.8-1.2 m and a width of 0.1-0.2 m. The thickness is preferably 8-10 mm. Such ceramic panels with a wood décor may be used to replace for example laminate floorings with a wood décor in areas where high moisture resistance is needed. A mechanical locking system is particularly suitable to connect and install ceramic plank shaped panels and to form a waterproof floating floor. The installation is preferably made with offset short edges similar to an installation of wood and laminate floors. Long edges may be used to obtain high friction forces and to prevent displacement along the joint. Ceramic material is rigid and in many applications it is not necessary to use a tongue to lock the short edges vertically since the short edges may be locked vertically with the connected long edges. The edges may be formed with bevels and the space between the upper edges may be reduced to about 1 mm or even to a few tenths of a millimeter. The panels may also be installed with contact between the upper edges. Flexible material may be applied between the edges in order to prevent water to penetrate trough the joint and the locking system and down to the sub floor.

The plank shaped ceramic panel or tile is preferably digitally printed with a wood décor. The surface comprises preferably an embossing 29 that is made in register with the design as shown in FIG. 13d. A tile or a ceramic panel may comprise a so-called embossed in register surface structure similar to structures formed in laminate floorings. The embossing is formed by steel plates or structured foils that are pressed against the powder material prior to the heating process.

The strip part 6 extends in this embodiment along the whole long edge 4b and an edge portion 6a extends beyond the short edge 4d. The panels according to this embodiment have no locking system on the short edges. FIG. 13b shows the rear side. All locking systems used according to this disclosure may be used on long and/or short edges.

FIG. 13c shows an installation of several tiles or panels 1a-1e. A first tile 1a is installed in a first row R1. A second tile 1b in a second row R2 is connected with angling to the first tile 1a in the first row R1. A third tile 1c is installed with angling against the first tile 1a in the first row R1. The edge portion 6a of the strip part gives an accurate spacing of the short edges 4c, 4d. A fourth tile 1d is installed and locked to the second 1b and third tile 1c in the second row R2. The locked long edges of the first 1a and the fourth tile 1d prevents a separation of the short edges 4c and 4d of the second 1b and the third 1c tiles in the second row R2 and all edges are locked vertically and horizontally.

FIG. 13d shows a tile 1a with an underlay 2 attached to the rear side. The undelay covers preferable the major part of the strip and may be used to reinforce the strip part and/or to increase the connection between the strip part and the tile 1a. The underlay may be a foam, cork material, rubber or similar material and may also be used to increase the friction between the underlay 2 and the sub floor 3. The underlay may also comprise glass fibres or may be an LVT or WPC sheet.

Core grooves 56 may be formed in the rear side of a tile in order to decrease the weight. The strength of the tile may still be sufficient especially if the core grooves are covered with appropriate underlay materials 2 that preferably are bonded to the rear side. Preferably, such underlay material 2 comprises glass fibres that preferably are combined with a polymer material.

FIG. 13d shows that embossing 29 may be formed with different gloss levels 44a or 44b.

Preferably such different gloss levels are combined with an in register embossed structure. The upper part 44a of the embossed structure may have a lower or higher gloss level than the lower part 44b. The advantage is that the visual embossing will be more pronounced even when the lower parts of the embossed portions are only about 0.2-0.5 mm below the upper parts and such tiles are easier to clean.

Different gloss levels may be formed with digital printing. A binder pattern may be applied with a digital ink head, powder may be applied on the pattern and non-bonded powder may be removed.

It is obvious that the above described embodiments comprising an underlay, embossing with different gloss levels and core grooves may be used individually, in combinations and in conventional tiles without a mechanical locking system.

Figure 14A:
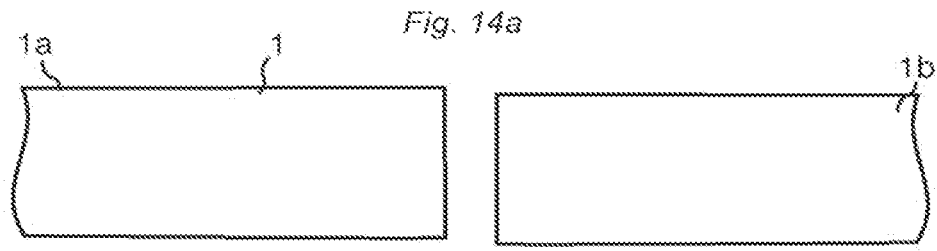
FIGS. 14a-14e illustrate embodiments of locking systems suitable to lock short edges
Figure 14B:
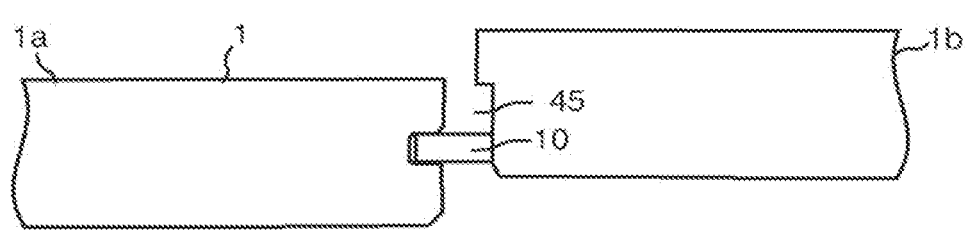
Figure 14C:
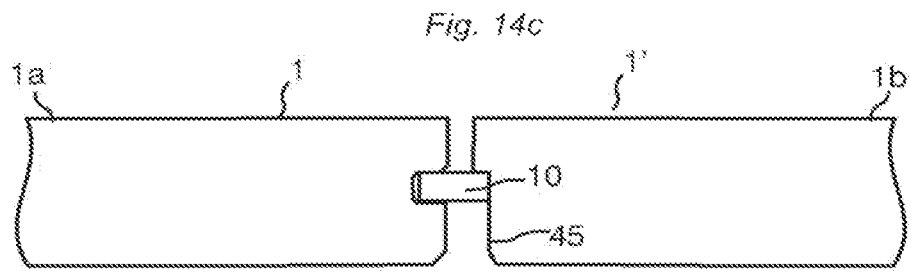
Figure 14D:
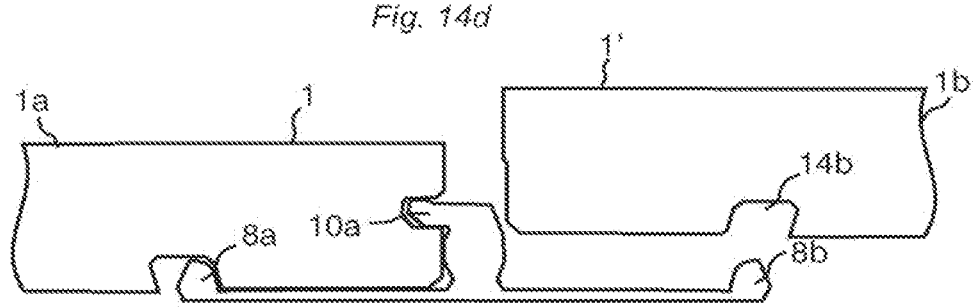
Figure 14E:
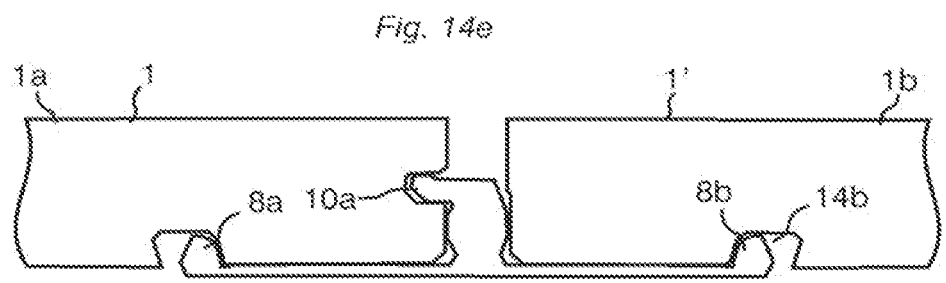

FIGS. 14a-14e show embodiments that preferably may be used to connect short edges with vertical folding. FIG. 14a shows straight edge portions. FIGS. 14b and 14c shows edge portions comprising a tongue 10 and a recess 45 that are used to obtain a correct space between the edges and to position the edges horizontal such that a new tile may be easier to connect with angling to the long edges. FIGS. 14d and 14e show a strip part that only locks horizontally.

Figure 15A:
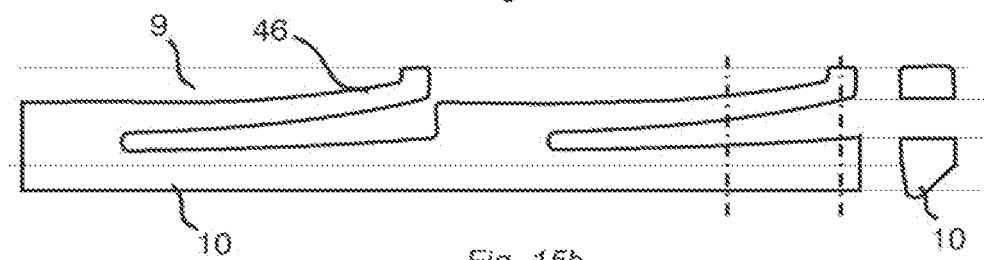
FIGS. 15a-15e illustrate embodiments of flexible tongues
Figure 15B:
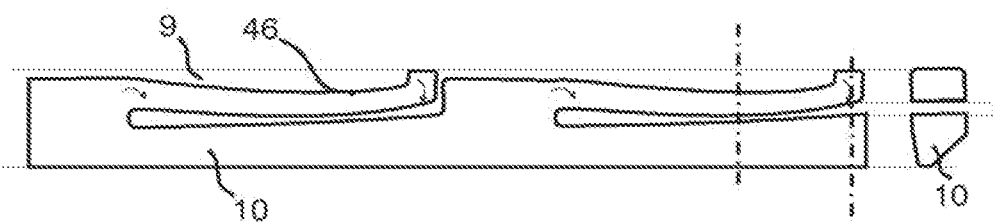
Figure 15C:
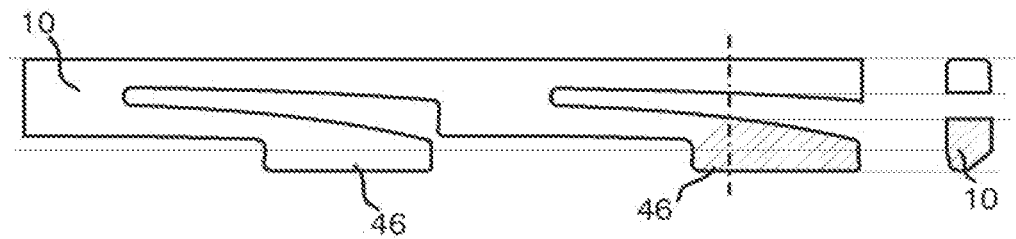
Figure 15D:
Figure 15E:
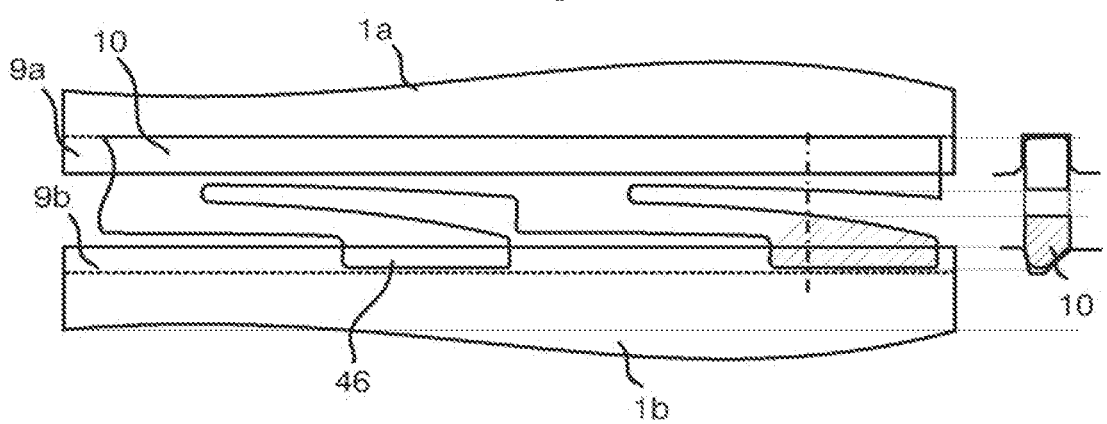

FIGS. 15a-15e show a flexible tongue 10 that may be used to connect adjacent edges. The tongue comprises flexible protrusions 46 that may be located in an inner part of an essentially horizontal groove or at an outer part of the tongue and that may protrude beyond a vertical plane. FIGS. 15a, 15c, 15e shows the flexible tongue in an outer position and FIGS. 15b, 15d shows the tongue in an inner position during folding.

It is an advantage to use a tongue comprising flexible protrusions protruding beyond the vertical plane when tiles are locked with a space S between upper edges. The tongue may be firmly fixed into the grove 9 since there are no parts that have to be displaced in the inner part of the groove 9 during locking. The tile edges are rigid and sufficient locking strength may be obtained even in the case when the protruding protrusions are spaced from each other.

Figure 16A:
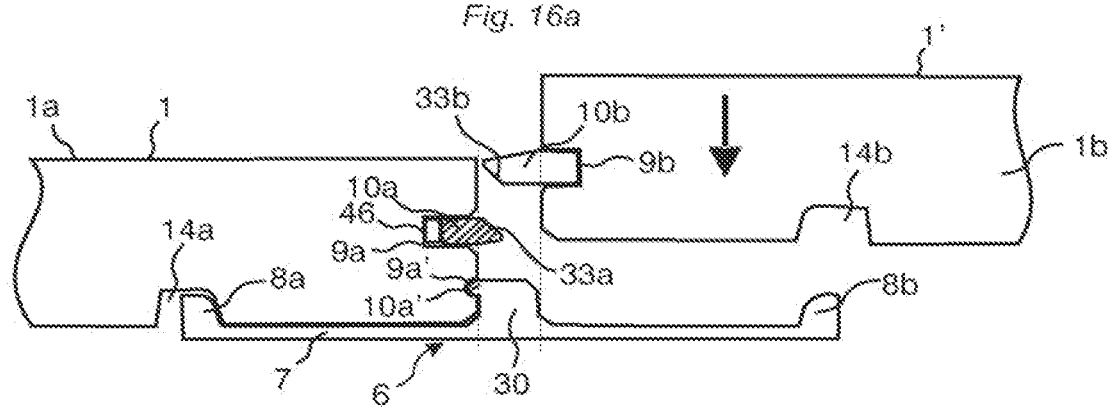
FIGS. 16a-16e illustrate an alternative embodiment of the invention and a method to connect a strip part

FIG. 16a shows an embodiment comprising a strip part 6 having a vertically protruding tongue body 30 comprising a horizontally extending tongue 10a' at an upper part connected to a first horizontal groove 9a'. A flexible tongue 10a with flexible protrusions 46 in located in an inner part of the horizontal groove 9a is connected into a second horizontal groove 9a located at the same edge and above the first horizontal groove 9a'. The adjacent edge 1' comprises an essentially rigid tongue 10b located in a horizontal groove 9b. The flexible tongue 10a comprises a sliding surface 33a at its upper an outer part that cooperates during locking with a sliding surface 33b located on the lower and outer part of the adjacent rigid tongue 10b.

Figure 16B:
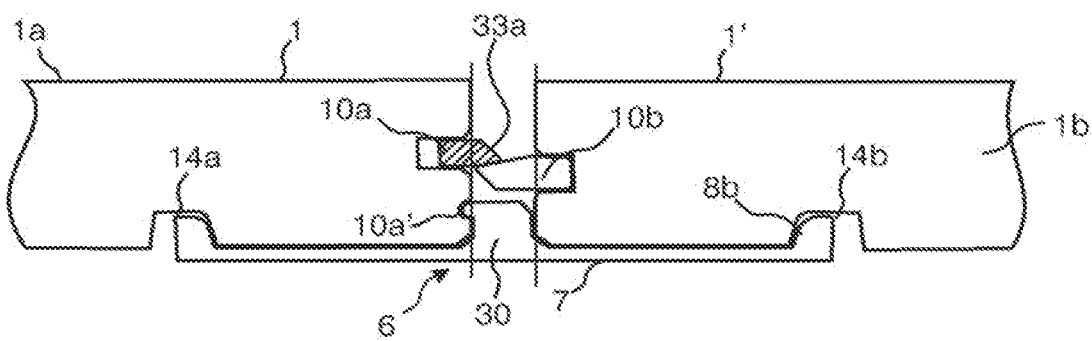

FIG. 16b shows the edges 1, 1' in locked position. The tongue body 30 is preferably used to prevent displacement of the edges towards each other.

Figure 16C:
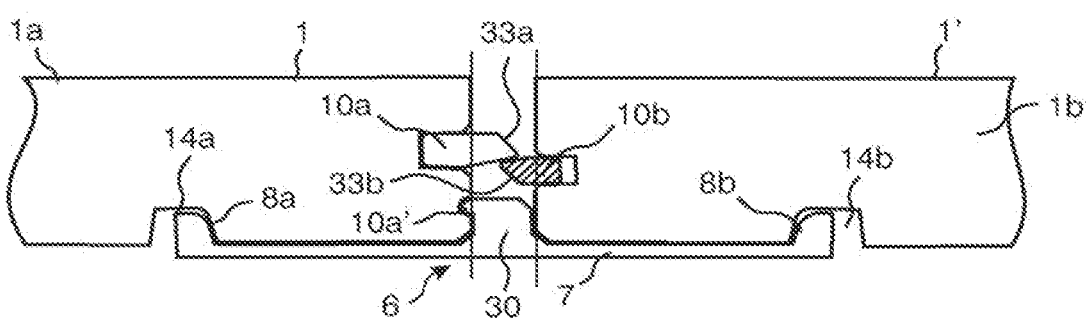
Figure 16D:
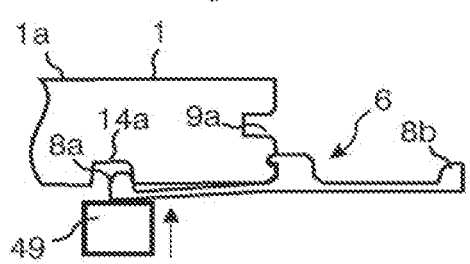

FIG. 16c shows an embodiment where a rigid tongue 10a and the strip part 6 are located and connected to the same edge 1. The flexible tongue 10b is located in the adjacent edge 1'. The rigid tongue 10a comprises a sliding surface 33a in its upper and outer part and the flexible tongue 10b comprises a sliding surface 33b at its lower and outer part.

The separate tongues and the strip part 6 may be used separately or in combination. A strip part 6 that only connect the edges horizontally may preferably be attached to the lower part of the edges a shown in FIG. 16a. The long edges may for example be locked with a locking system as described in FIG. 12d. The strip part combined with the separate tongues may be used to connect for example the long edges or the short edges with angling or horizontal snapping.

FIG. 16d shows a method to connect the strip part 6 to the first edge 1. The strip part 6 is moved essentially horizontally towards the edge and connected to the first horizontal groove 9a. The locking element 8a is pressed into the first vertical groove 14a. Preferably a pressing wheel 49 is used.

Figure 16E:
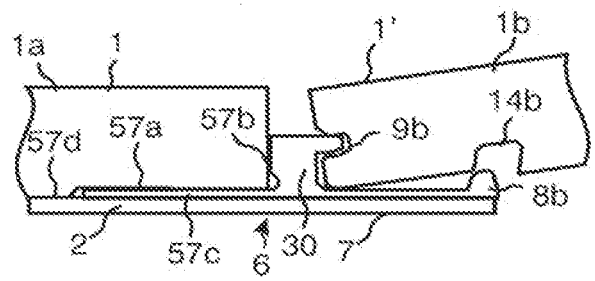

FIG. 16e shows that the strip part may be glued to the first edge 1. A glue layer 57a, 57b may be applied between the strip body 7 and a lower part of the tile and/or between a vertical edge part and the tongue body 30. A sublayer 2 may be bonded or glued with a glue layer 57d to a rear side of the tile 1 and the strip part 6 may also be glued with a glue layer 57c to the sub layer 2. This embodiment is characterized in that a vertical 14b and a horizontal 9b groove is only formed in one 1' of two opposite edges 1, 1'. One of the edges comprises preferably an end edge 1 that is essentially vertical from the tile surface and to the rear side of the tile. Gluing of the strip part to a tile may be combined with all other embodiment described in this disclosure.

FIGS. 17a-17e shows a locking system comprising a flexible tongue 10a having flexible protrusions 46 that protrude beyond the vertical plane VP as shown in FIG. 15c. The strip part 6 is similar to the strip part 6 shown in FIG. 16a. The flexible protrusions comprises a sliding surface 33a at the upper and outer part that during vertical displacement cooperates with a sliding surface 33b formed at the lower part of an adjacent tile edge 1'. The flexible protrusions 46 are essentially displace horizontally within the space S between the edges. The locking element 8b and a locking groove 14b prevents a horizontal displacement inwardly and outwardly. Such displacement may also be prevented with horizontally protruding parts 30' located between the edges.

Figure 17A:
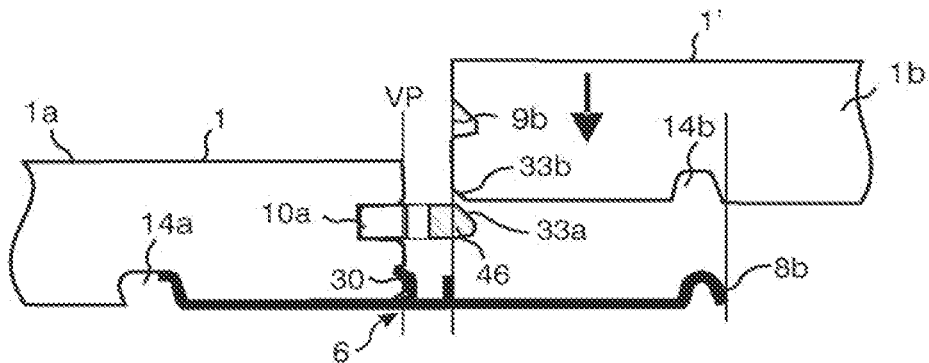
FIGS. 17a-17e illustrate an alternative embodiment of the invention and tiles installed on a wall.
Figure 17B:
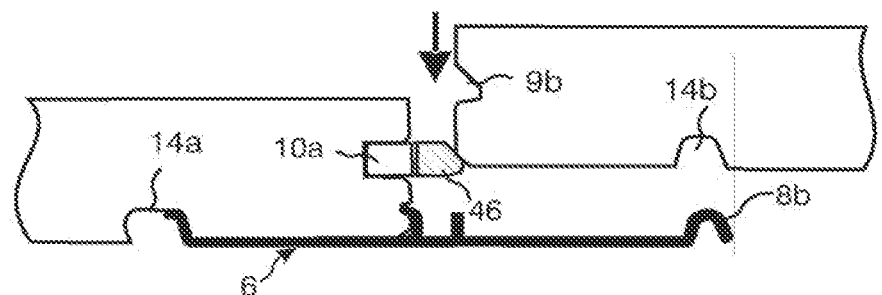
Figure 17C:
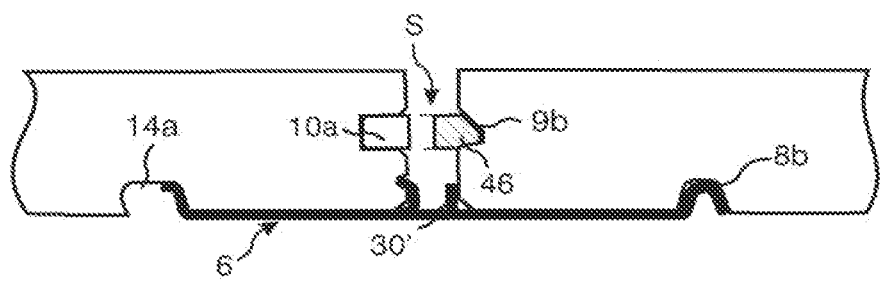
Figure 17D:
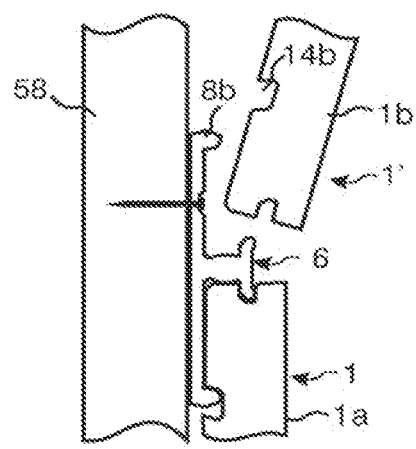
Figure 17E:
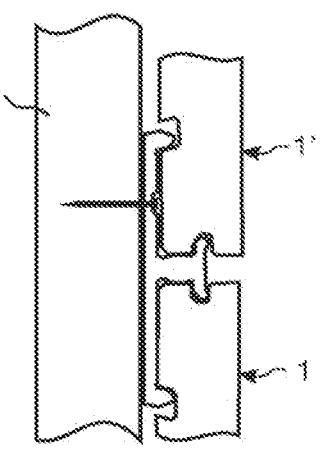

FIGS. 17d and 17e show that all embodiments of the disclosure may be used to connect tiles 1a, 1b to an indoor or outdoor wall 58. Preferably the strip part is mechanically connected with spikes, screws, special clips or extrude profiles and similar. Tiles may also be glued to a wall and the strip part 6 may be used to position the tiles.

Figure 18A:
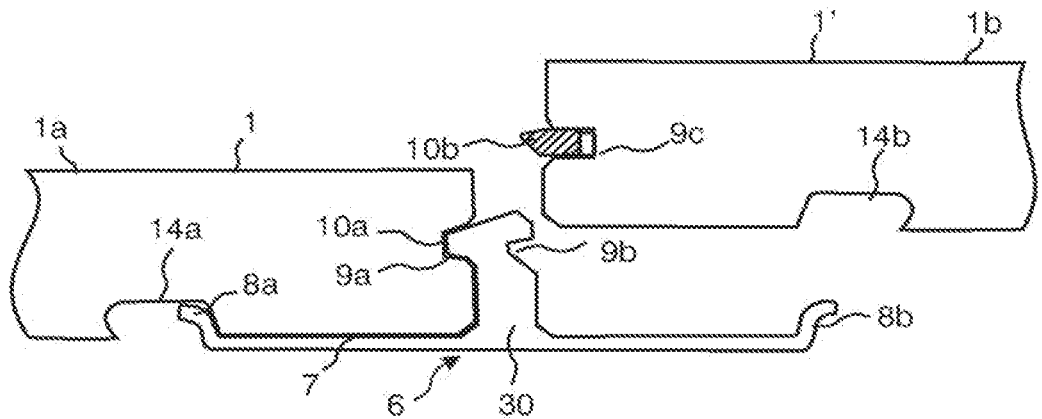
FIGS. 18a-18d illustrate an alternative embodiment of the invention and a method to disassemble installed tiles
Figure 18B:
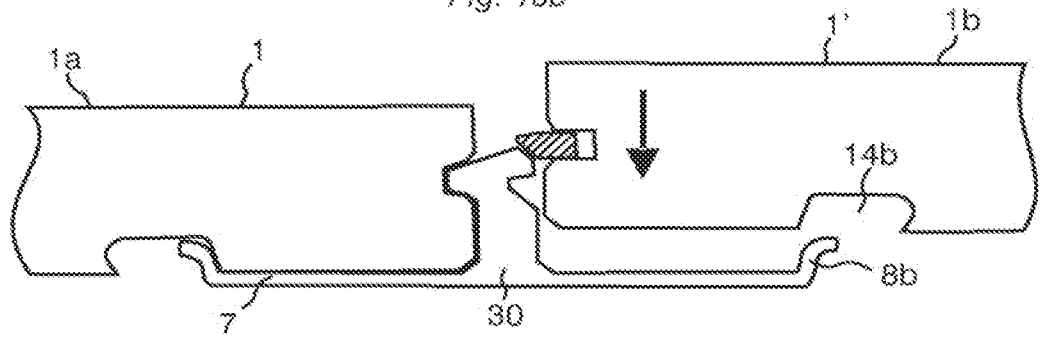
Figure 18C:
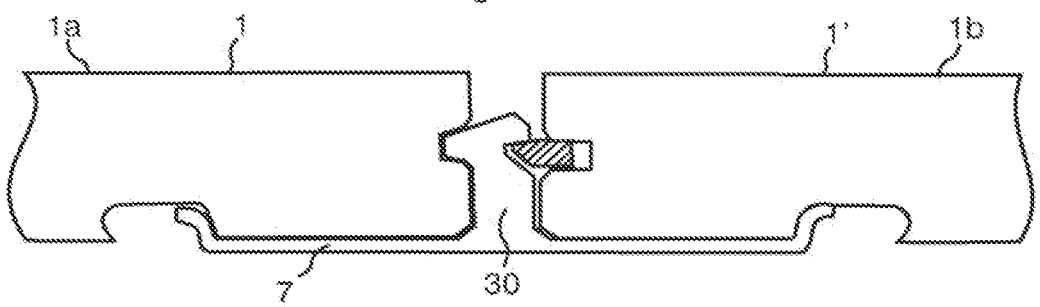
Figure 18D:
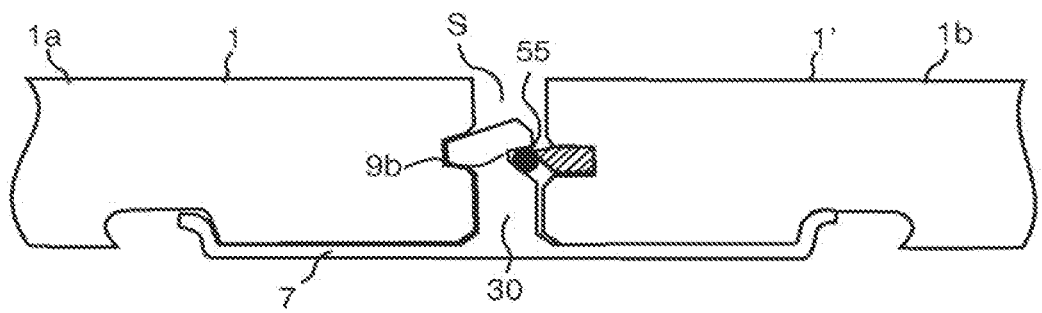

FIGS. 18a-c show a strip part comprising a tong body 30 having a tongue 10a and a tongue groove 9b. The adjacent edge comprises preferably a flexible tongue 10b located in a horizontal groove 9c. FIG. 18d shows that the tile edges may be designed such that they are possible to be released after installation. The grout material is removed and a disassembly tool 55 is inserted via the space S and into the grove 9b such that a flexible tongue is pressed inwardly towards the tile edge and the locking system released. All embodiments of the invention comprising a flexible tongue may be disassembled in a similar way. Locking systems with flexible tongues allow that tiles may be disassembled in a middle section of a floor. Tiles may also be disassembled from the first and the last rows.

Figure 19A:
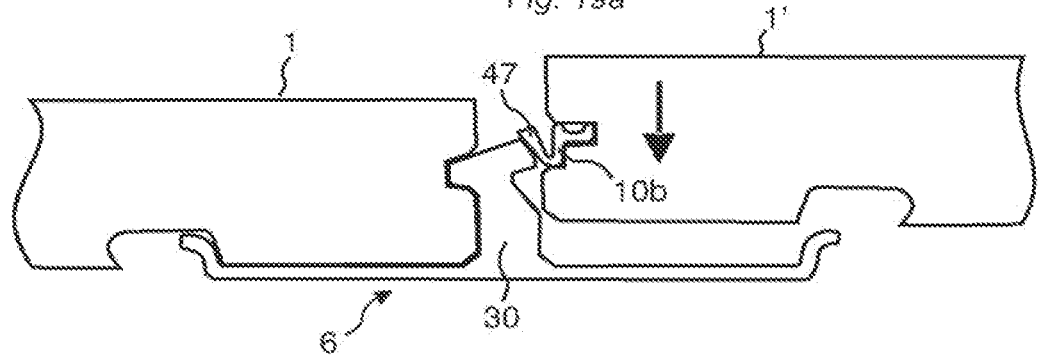
FIGS. 19a-19d illustrate embodiments of locking system with a resilient snap tab
Figure 19B:
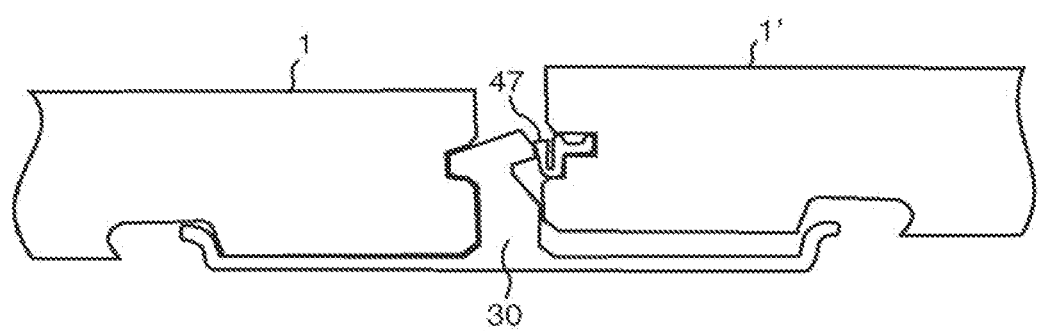
Figure 19C:
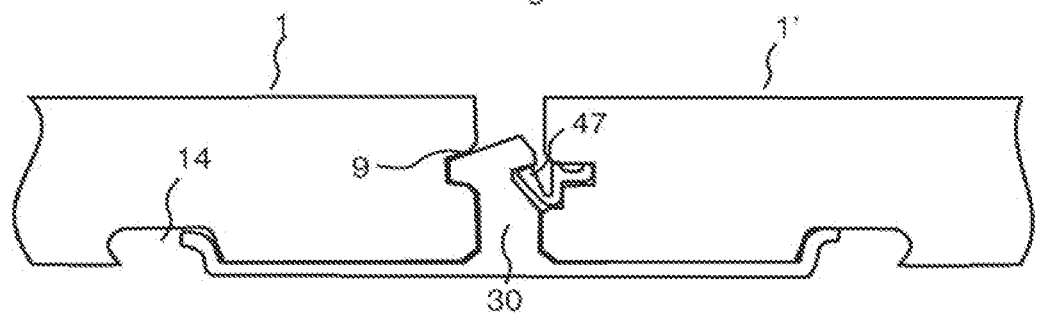
Figure 19D:
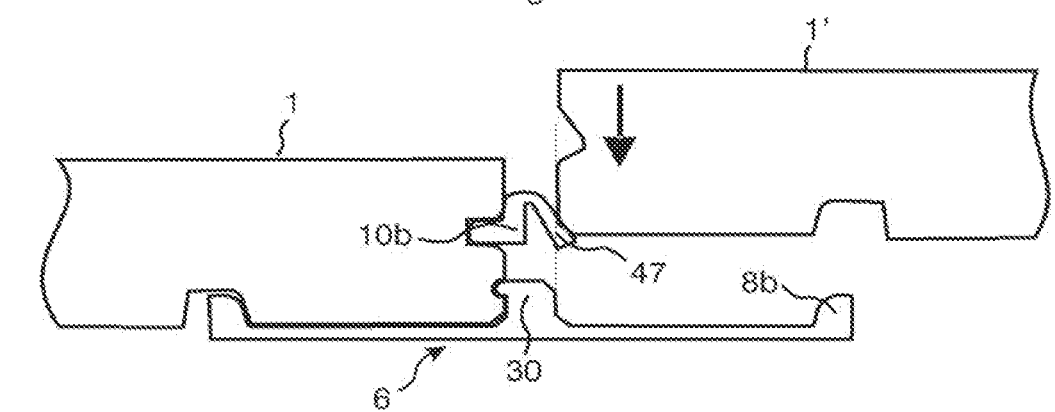

FIGS. 19a-19c shows essentially the same embodiment as in FIG. 18a-c. The flexible tongue 10b comprises a flexible snap tab 47 at its outer end. The flexible tongue 10b may be connected to the folding tile 1' as shown in FIG. 19a or to the strip tile 1 comprising the protruding strip part 6 as shown in FIG. 19d.

Figure 20A:
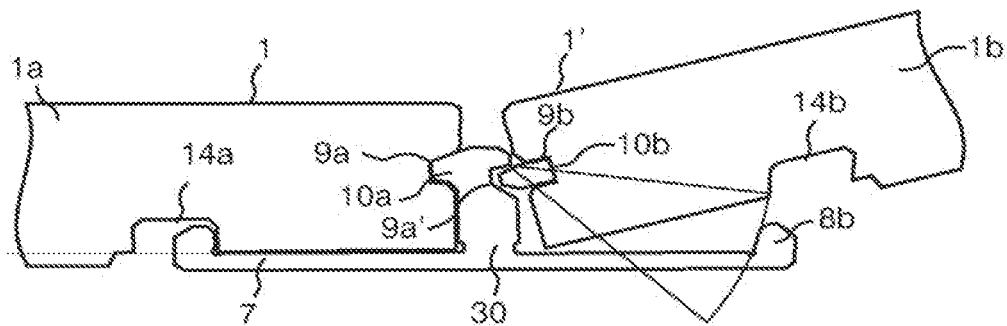
FIGS. 20a-20d illustrate an embodiment of a locking system comprising an integrated grout material
Figure 20B:
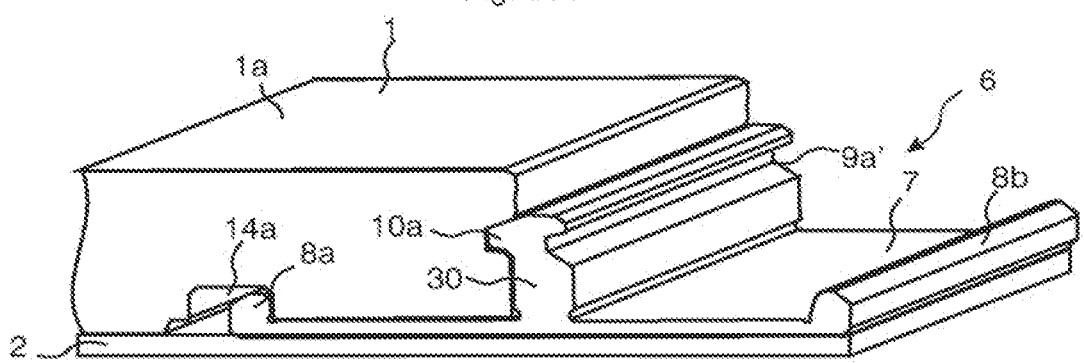
Figure 20C:
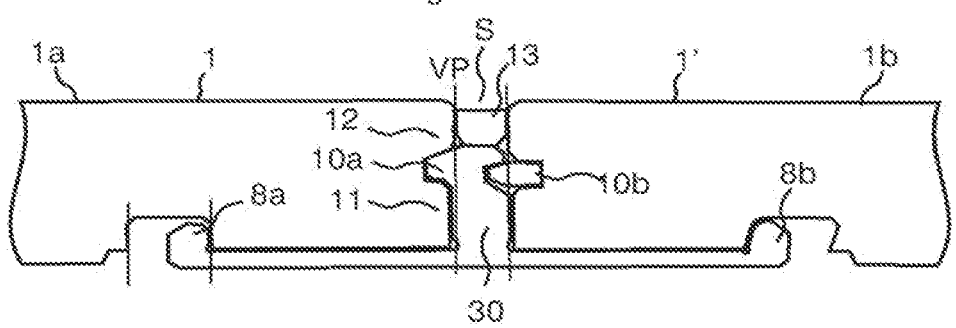
Figure 20D:
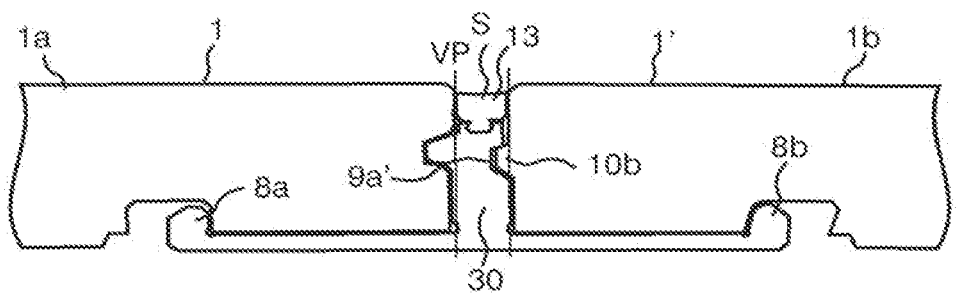

FIGS. 20a-c show a strip part 6 comprising a tong body 30 having a tongue 10a and a tongue groove 9a' formed in the tongue body 30. The adjacent edge 1' comprises preferably an essentially rigid tongue 10b located in a horizontal groove 9b. FIG. 20d shows that a rigid tongue 10b may also be formed in the tile material. The horizontal groove 9a' may be formed close to the adjacent edge 1' and the rigid tongue 10b may be rather small and may protrude about 1-2 mm beyond the upper edge even in the case when the tiles are installed with a space of 2-5 mm between the upper edges. FIG. 20c shows that a flexible grout material 13 may be bonded to the upper part of the tongue body 30. FIG. 20d shows that the grout material 13 may be mechanically connected to the tongue body 30.

FIGS. 21a-21e shows that tiles are not completely rectangular or square. Length L or width W may vary. Long and short edges 4a, 4b, 4c, 4d are often not completely parallel with each other and long edges are often not completely perpendicular and formed with a perfect 90 degree angle.

Theoretically tiles may be machined such that size tolerances are eliminated. Practically this is not a suitable method due to high costs and the fact that bevels or rounded edges will be damaged. Horizontal 9 and vertical 14 grooves cannot be formed with the upper edges as a reference surface since tolerance will be accumulated and larger areas comprising several tiles installed in several rows will not be possible to install.

The locking system must be designed such that each row is perfectly aligned and that the size tolerances of the tiles are compensated by variations of the space S between the edges. This is a major difference compared to laminate and wood floors that are machined to a perfect rectangular form and installed with a tight fit between the upper edges.

The problem may be solved with a positioning system that prior to the forming of the grooves align the tiles with a predetermined position of one long edge 4a and one short edge 4c. Such alignment may be made with cameras or with a positioning tool 50 as shown in FIGS. 21a-21e. The positioning tool comprises a first positioning surface 51 and a second positioning surface 52 that are completely perpendicular to each other. A long edge 4a or a first edge in case the tiles are square, is displaced such that it is in contact with the first positioning surface 51. The tile is thereafter displaced along the positioning surface until a short 4c or a second edge is in contact with the second positioning surface 52. FIGS. 21a-21e shows a tile with a contact point 53 at an outer tile corner.

After positioning of the tile vertical and horizontal grooves are formed parallel with the first and second positioning surfaces and with a pre-defined distances D1, D2, D3, D4, D5, D6, D7. One of the edges, preferably one of the long edges 4a that has been positioned against the first positioning surface 51 comprises grooves 14a, 9a that are essentially parallel with the edge. At least one of the other edges may comprise horizontal or vertical grooves with an actual horizontal distance Ad3, Ad4 to the edge that varies along the edge, in case the edge is not parallel with a pre-defined geometry. Such distance may vary between the same edge of two different tiles, for example to the vertical groove 14a that is used to connect the strip part or to the adjacent vertical groove 14b that during locking is connected to the strip parts as shown in FIG. 20a in case the length L or width W deviates from a pre-determined geometry.

FIG. 21b shows a cross section A-A at one part of a short edges 4c and FIG. 21c shows a cross section B-B at another part of the short edge 4c. The edge is not completely parallel with the positioning tool. The horizontal groove 9 and the vertical groove 14c are formed at a pre-defined distances D2, D3 from an aligned position defined by the positioning tool 50.

The actual horizontal distances Ad3, Ad4, Ad5, Ad6 from the vertical plane VP and to the inner wall 20 of the horizontal groove 9 and to the first wall 24 of the vertical groove 14c varies along the edge 1. The figures show that even the lower lip 11 may be formed against a pre-determined position. This means that the actual horizontal distance Ad7, Ad8 between the outer part of the lower lip 11 and the upper edge or the vertical plane VP may vary along the edge.

FIGS. 21d and 21e show that the above described distances Ad7, Ad8 on an edge 4b of a first tile and the distances Ad7', Ad8' and on an edge 4b' of a second tile may vary between the same groves parts 24, 24', 20, 20' located on the same edge 4b, 4b' of two different tiles 1a and 1b when the tiles 1a, 1b have different widths or lengths.

Preferably the tiles according to the invention are characterized in that there is a first horizontal distance Ad7 between a first groove wall 24 of a first edge 1 of a first tile 1a and an upper and outer part of the first edge 1 of the first tile 1a,
  that there is a second horizontal distance Ad9 between a first groove wall 24 of a second edge 1' of a first tile 1a and an upper and outer part of the second edge 1' of the first tile 1a,
  that there is a third horizontal distance Ad7' between a first groove wall 24 of a first edge 1 of a second tile 1b and an upper and outer part of a first edge 1 of the second tile 1a,
  that there is a fourth horizontal distance between a first groove wall 24 of a second edge 1' of the second tile 1b and an upper and outer part of the second edge 1' of the second tile 1b.

The first horizontal distance may vary along the first edge 1 of the first tile 1a and/or the second horizontal distance may vary along the second edge 1' of the second 1b tile. The third horizontal distance may vary along the first edge 1 of the second tile 1b. The fourth horizontal distance may vary along the second edge 1' of the second tile 1b. The first horizontal distance may be different from third horizontal distance and/or the second horizontal distance may be different from the fourth horizontal distance.

The above-described method may be used to form floor panels as describes in FIG. 9c. The horizontal distance from the vertical plane VP and to the outer part of the tongue 10, and/or the inner part of the tongue groove 9, and/or to the a surface on the locking element 8, and or to as surface on the locking groove 14 may vary along at least one of the edges of the panel or between two opposite edges.

It is a major advantage if flexible grout material may be integrated with a tile edge and factory connected prior to installation. The grout material serves several purposes. It is used to compensate size tolerances, to prevent water to penetrate into the joint and to create decorative effects. Grout material may be attached to all four edges or only on one long and one short edge. The disadvantage is that an installation will comprise many joints between the grout materials.

Figure 22A:
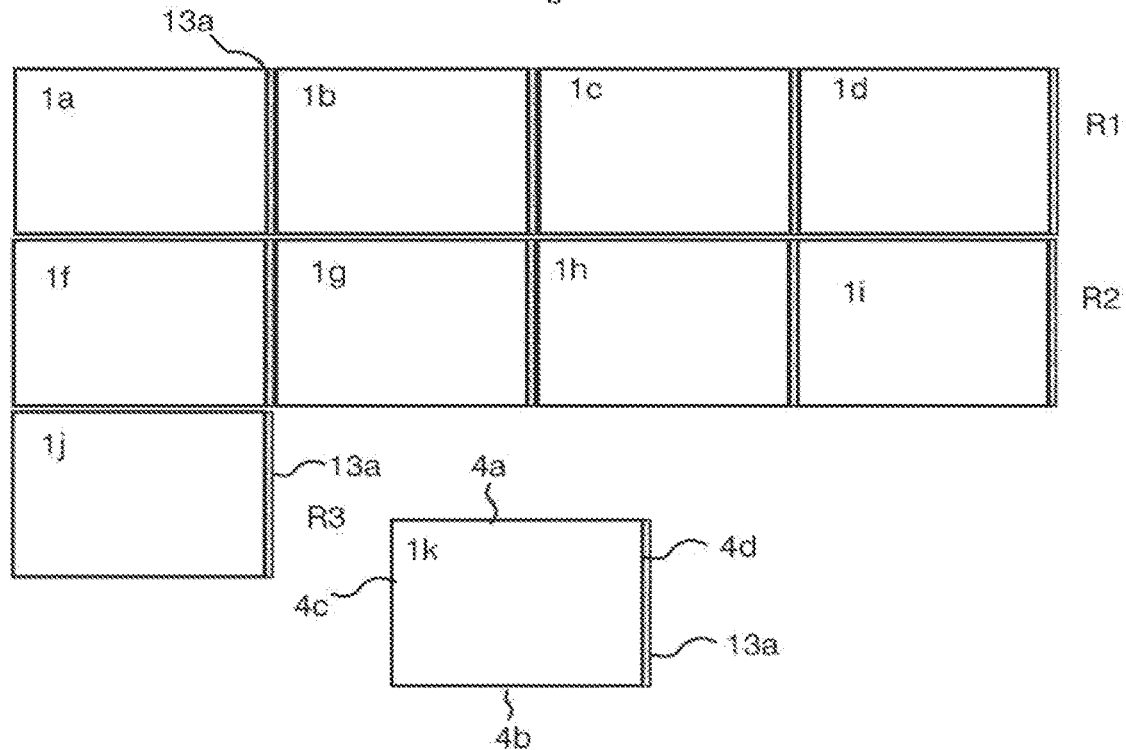
FIGS. 22a-22b illustrate an embodiment of an application of a grout material.
Figure 22B:
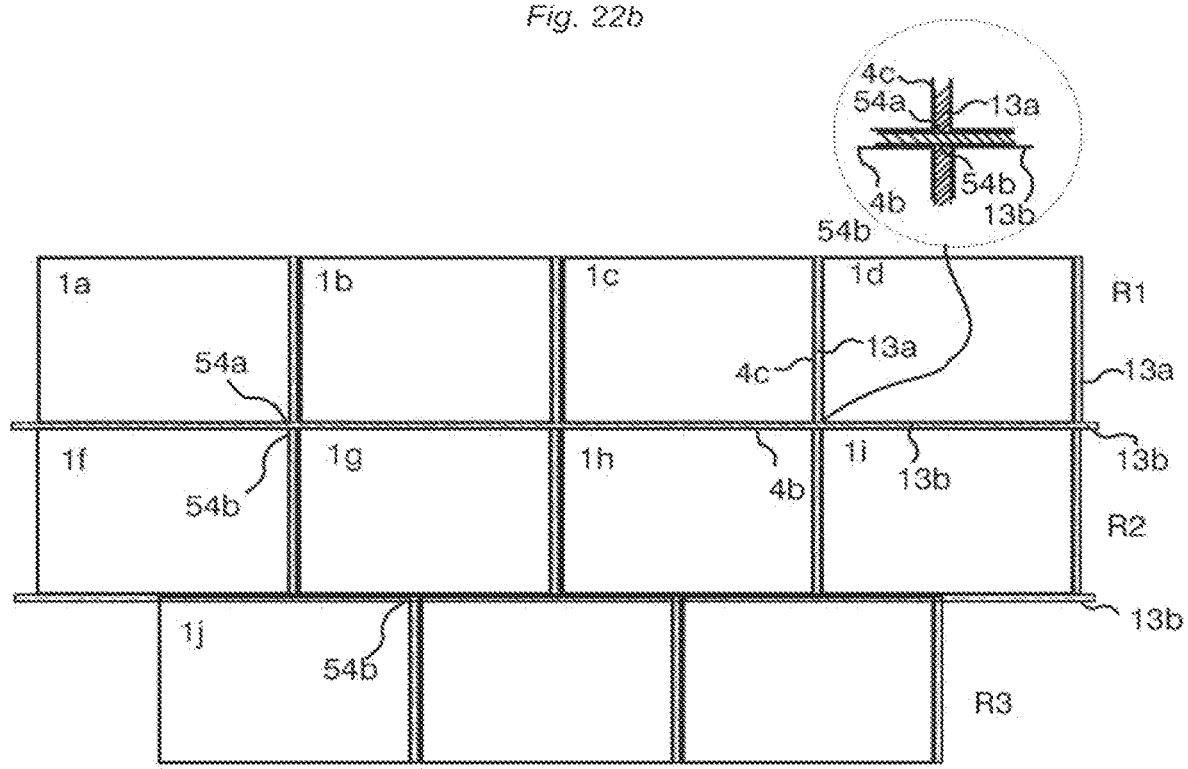

FIG. 22a shows that a preferably flexible grout material 13a may be attached to only one edge of a tile, preferably a short edges 4d if the tiles are rectangular. Two rows R1, R2 of tiles 1a-1i may be installed as shown in FIG. 22a. A continuous grout material 13b, preferably formed as a flexible strip, may be inserted and pressed in between two installed rows R1, R2 as shown in FIG. 22b. The advantage is that a corner section will only comprise two joints 54a, 54b or only one joint 54b in case the tiles are installed with offset short edges 1f, 1j as shown in FIG. 22b. The Grout materials may be pressed against each other in the joints with a permanent pre tension and an almost invisible and moisture resistant joint may be formed.

Figure 23A:
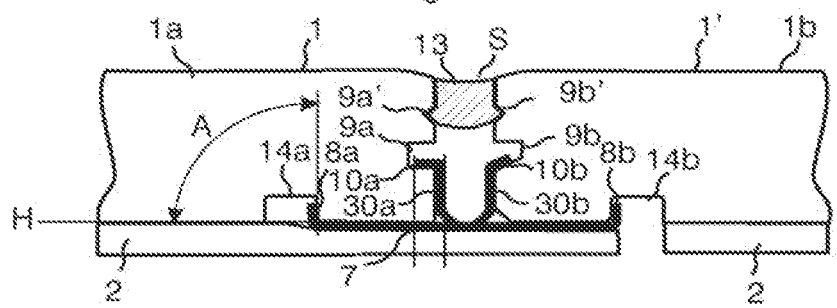
FIGS. 23a-23d illustrate embodiments of application of a grout material and an installation with horizontal snapping.

FIG. 23a shows an embodiment comprising upper 9a', 9b' and lower 9a, 9b horizontal grooves formed in the edge. The upper grooves 9a', 9b' may be used to accommodate a part of the grout material 13 and they may be formed such that they prevent vertical displacement of the edges when a grout material is applied between the edges. In some embodiments it may be possible to exclude the lower horizontal grooves 10a, 10b and the strip part may be connected to the edge with vertically extending tongue parts 10a, 10b that are locked to the vertical part of edge with friction forces. The strip part 6 may be used mainly to lock the edges in the horizontal direction and grout material may be used to lock the edges vertically. The locking system may be locked with angling, horizontal snapping and vertical snapping. The vertical grooves 14a, 14b and the locking elements 8a, 8b are preferably formed with cooperating locking surfaces extending vertically upwards with a locking angle A of about 90 degrees against a horizontal plane H. The advantage is that a strong horizontal locking may be achieved and may be combined with an easy locking and connection of the strip part. This may be accomplished with vertically extending tongue bodies 30a, 30b that may be flexible and may be bended in the space S when the strip part 6 is connected to the first edge 1 and during locking.

Figure 23B:
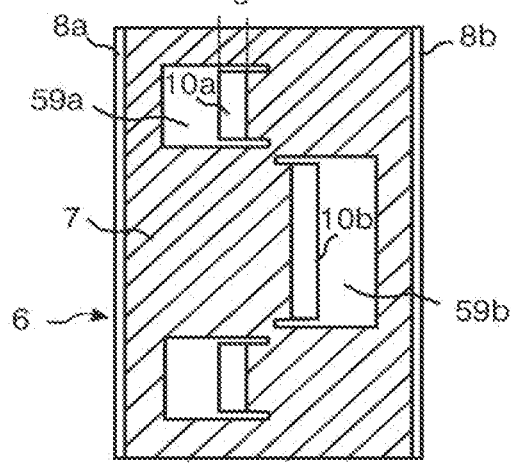

FIG. 23b shows a strip part 6 comprising tongues 10a, 10b and locking elements 8a, 8b formed by punching of a metal sheet, preferably a sheet of stainless steel with a thickness of preferably 0.3-0.5 mm. The cavity 59a, which is needed to form the first tongue 10a, is located between the first locking element 8a and the first tongue 10a. The cavity 59b, which is needed to form the second tongue 10b, is located between the second tongue and the second locking element 8b.

Figure 23C:
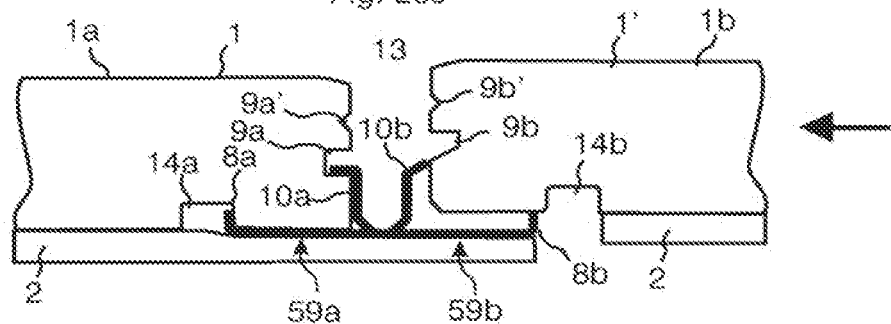
Figure 23D:
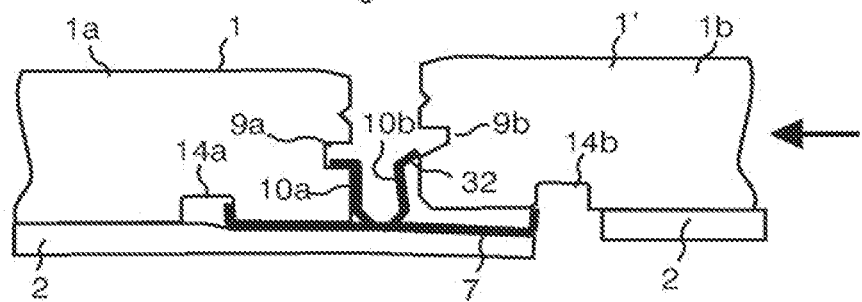

Such an embodiment provides increase flexibility especially if the tiles 1a, 1b are connected with horizontal snapping as shown in FIGS. 23c and 23d. The tongue 10b is during snapping pushed towards the adjacent edge horizontally and the tongue locking surface 32 is displaced slightly vertically upwards such that an easy locking may be obtained when the strip part 7 is bended backwards.

The locking system may be configured such that the horizontal locking force that prevents the edges to separate away from each other is stronger than the locking force that prevents the edges to be displaced towards each other. Displacement of the edges towards each other may be prevented by grout material applied in the space S.

Figure 24A:
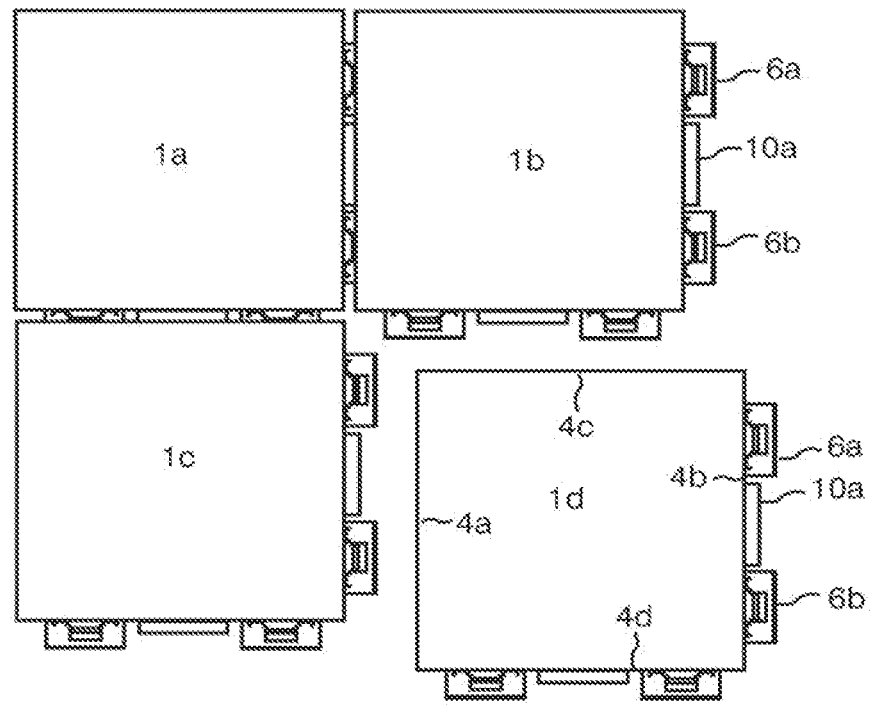
FIGS. 24a-24b illustrate an embodiment of an installation with horizontal snapping of two perpendicular edges.
Figure 24B:
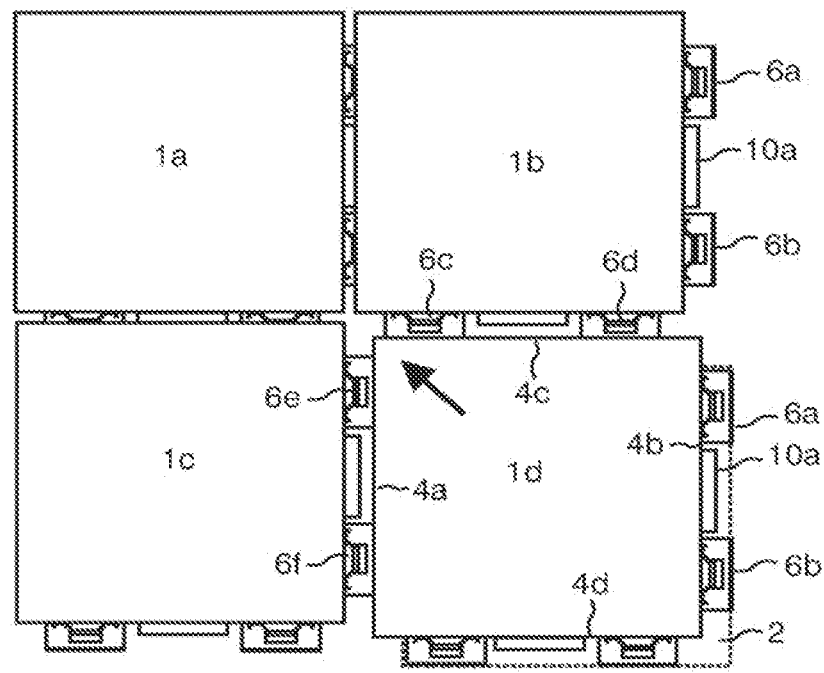

FIGS. 24a, 24b show installation of tiles with a snapping action that connect both a first 4a and a second 4b edge of a tile 1d with an essentially diagonal displacement towards two adjacent tiles 1b, 1c. Preferably a first 4a and a second edge 4c of a first tile 1d is placed on adjacent strip parts 6c, 6d, 6e, 6f of a second 1b and third 1c tile and the first tile 1d displaced essentially horizontally towards the second and third tiles such that a snapping connection is obtained. The advantage is that it is not necessary to connect for example a first edge 4a of a tile 1d to an adjacent tile 1c with horizontal snapping and then displace the tile 1d in locked condition and with high friction forces along the long edge 4a in order to snap the short edge 4c to another tile 1b.

All embodiments of the invention may be combined and used in combinations on different edges but also on the same edge. FIG. 24a shows that for example an edge 4a, 4b of a tile 1d may comprise several different separate materials 10a and strip parts 6a connected to vertical and/or horizontal grooves. The strength of the vertical locking may be increase if for example a separate tongue 10a is attached in a horizontal groove. Such separate tongue 10a may be for example located between two strip parts 6a, 6b. The tongue 10a may be rigid or flexible and may be used to connect tiles with angling, vertical snapping and horizontal snapping.

A separate tongue 10a located between two strip parts 6 may for example be used to replace the second tongue 10b in FIG. 23c and snapping may be obtained by just a bending of the protruding strip body 7. It is obvious that the separate tongue 10a may be connected to horizontal grooves formed in the first 1 and/or the second 1' edge and that several separate tongues may be attached to both edges, preferably offset to each other in the length direction of the joint edges.

FIG. 24b shows that an underlay 2 may be factory connected to the rear side of the tile 1d and under the strip parts 6a, 6b. The underlay material may comprise flexible material that increase the friction between the underlay and the sub floor and may be combined with an electrical floor heating system.

Figure 25A:
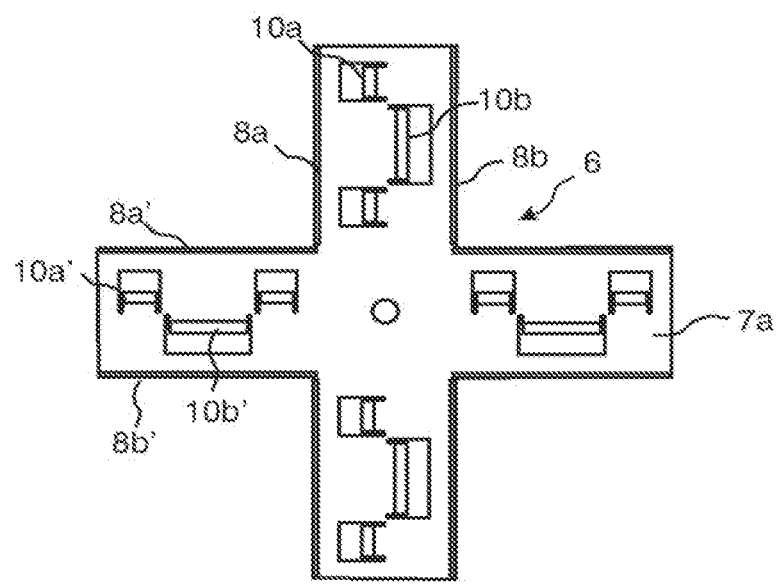
FIGS. 25a-25b illustrate an embodiment of a strip part that may be used to connect corner sections.
Figure 25B:
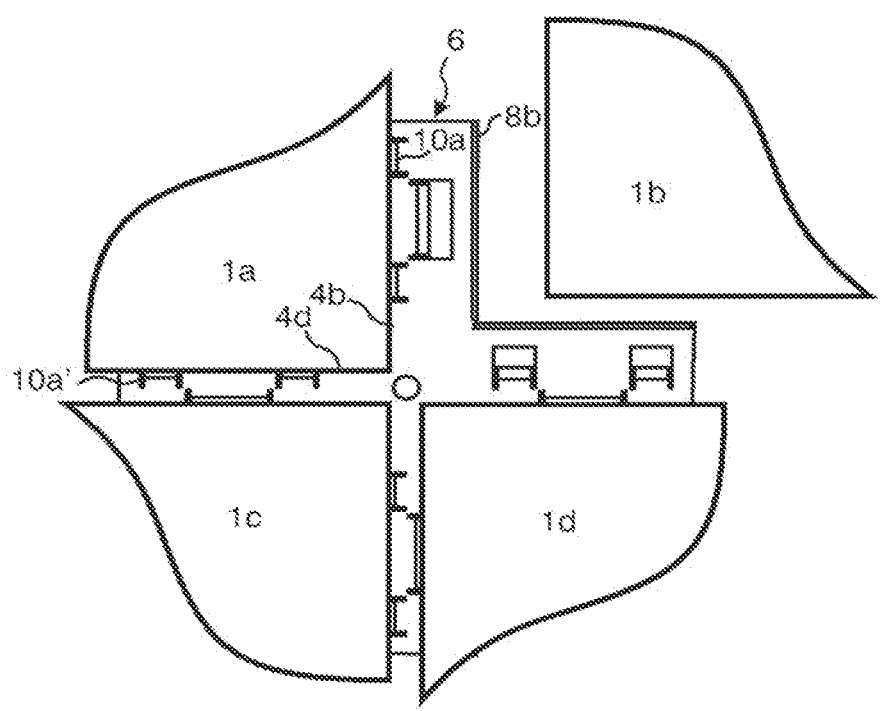

FIGS. 25a and 25b show a strip part 6 that may be used as a corner part to lock eight adjacent edges of four tiles 1a, 1b, 1c, 1d. The strip part 6 comprises locking elements 8a, 8a' and tongues 10a, 10a' configured to be locked to a first edge 4b and a second edge 4d which are perpendicular and adjacent to each other and form a part of a corner section of a tile. Such strip parts 6 configured to be used as corner parts 6 are particularly suitable to connect tiles, which are installed vertically on a wall, and only one screw may be needed to connect a corner part 6 to a wall.

All horizontal and vertical grooves and all equalizing grooves may extend along the whole edge or may be formed on only a part of an edge preferable where the strip parts 6 are intended to be connected to an edge. Preferably rotating tools with jumping tool heads may be used to form grooves in a part of an edge.

EMBODIMENTS

1. A set of ceramic or stone tiles comprising a first tile (1a) provided with a first edge (1) and a second tile (1b) provided with a second edge (1') wherein the tiles are provided with a locking system for locking the first edge (1) to the second edge (1') in a horizontal direction parallel with a tile surface and in a vertical direction perpendicular to the horizontal direction, said locking system comprises a first and a second tongue (10a, 10b) and a strip part (6) provided with a first and a second locking element (8a, 8b), characterized in:

that the first edge (1) is provided with a first horizontal groove (9a) and a first vertical groove (14a) formed in a body of the first tile (1a), wherein the first locking element (8a) is configured to cooperate with the first vertical groove (14a) for locking in the horizontal direction and the first tongue (10a) is configured to cooperate with the first horizontal groove (9a) for locking in the vertical direction, that the second edge (1') is provided with a second horizontal groove (9a) and a second vertical groove (14b) formed in a body of the second (1b) tile wherein the second locking element (8b) is configured to cooperate with the second vertical groove (14b) for locking in the horizontal direction and the second tongue (10b) is configured to cooperate with the second horizontal groove (9b) for locking in the vertical direction, that each of the first and the second horizontal groove (9a, 9b) comprises an upper lip (12) and a lower lip (11), that the lower lip (11) of the first horizontal groove (9a) extends horizontally to or is within an upper and outer part of the first edge (1) and the lower lip (11) of the second horizontal groove (9b) extends horizontally to or is within an upper and outer part of the second edge (1'), that there is a space (S) between the outer and upper part of the first edge (1) and the outer and upper part of the second edge (1') in a locked position of the first and the second edge (1, 1').

2. The set of embodiment 1 characterized in that the lower lip (11) of the first horizontal groove (9a) extends horizontally essentially to the upper and outer part of the first edge (1) and the lower lip (11) of the second horizontal groove (9b) extends horizontally essentially to the upper and outer part of the second edge (1').

3. The set of embodiment 1 or 2, wherein a depth of the first horizontal groove (9a) measured as the horizontal distance from a vertical plane (VP), located at the upper and outer part of the first edge, and to a bottom of the first horizontal groove, varies along the first edge; or wherein a depth of the second horizontal groove (9b), measured as the horizontal distance from a vertical plane (VP), located at the upper and outer part of the second edge, and to a bottom of the second horizontal groove (9b), varies along the second edge.

4. The set of embodiment 3, wherein the depth of the horizontal groove varies with at least 0.10 mm.

5. The set of any one of the preceding embodiments 1-4, wherein the strip part (6) comprises a vertically extending tongue body (30), wherein the first tongue (10a) protrudes from the vertically extending tongue body (30).

6. The set of any one of the preceding embodiments 1-5, wherein the locking system is configured to be locked by angling and/or vertical snapping and/or horizontal snapping of the first (1) and the second tile (1').

7. A set of ceramic or stone tiles (1a, 1b), each comprising a first (1) and a second (1') edge which are provided with a locking system for locking in a horizontal direction parallel with a tile surface and in a vertical direction perpendicular to the horizontal direction, wherein the first edge (1) of the first tile (1a) is lockable in the vertical and in the horizontal direction to the second edge (1') of the second tile (1b), wherein the second edge (1') of the first tile (1a) is lockable in the vertical and in the horizontal direction to the first edge (1) of the second tile (1b), wherein said locking system comprises a first and a second tongue (10a, 10b) and a strip part (6) provided with a first and a second locking element (8a, 8b), characterized in:

that the first edge (1) is provided with a first horizontal groove (9a) and a first vertical groove (14a) formed in a body of the first and the second tile (1a,1b), respectively, that the second edge (1') is provided with a second horizontal groove (9a) and a second a vertical groove (14b) formed in a body of the first and the second tile (1a,1b), respectively, wherein the first locking element (8a) is configured to cooperate with the first vertical groove (14a) for locking in the horizontal direction and the first tongue (10a) is configured to cooperate with the first horizontal groove (9a) for locking in the vertical direction, wherein the second locking element (8b) is configured to cooperate with the second vertical groove (14b) for locking in the horizontal direction and the second tongue (10b) is configured to cooperate with the second horizontal groove (9b) for locking in the vertical direction, that each of the first and the second vertical groove (14a,14b) comprises a first groove wall (24), a second groove wall (25) and an upper surface (25), that the first groove wall (24) of the first vertical groove (14a) is closer to the upper and outer part of the first edge (1) than the second groove wall (25) of the first vertical groove (14a)

that the first groove wall (24) of the second vertical groove (14b) is closer to an upper and outer part of the second edge (1'), than the second groove wall (25) of the second vertical groove (14b), that there is a first a horizontal distance (Ad7) between the first groove wall (24) of the first edge (1) of the first tile (1a) and an upper and outer part of the first edge (1) of the first tile (1a), that there is a second horizontal distance (Ad9) between the first groove wall (24) of the second edge (1') of the first tile (1a) and an upper and outer part of the second edge (1') of the first tile (1a), that there is a third horizontal distance (Ad7') between the first groove wall (24) of the first edge (1) of the second tile (1b) and an upper and outer part of the first edge (1) of the second tile (1a), that there is a fourth horizontal distance between the first groove wall (24) of the second edge (1') of the second tile (1b) and an upper and outer part of the second edge (1') of the second tile (1b), that the first horizontal distance varies along the first edge (1) of the first tile (1a); and/or the second horizontal distance varies along the second edge (1') of the second (1b) tile;

and/or the third horizontal distance varies along the first edge (1) of the second tile (1b);

and/or the fourth horizontal distance varies along the second edge (1') of the second tile (1b);

and/or the first horizontal distance is different from third horizontal distance and/or the second horizontal distance is different from the fourth horizontal distance.

8. The set of embodiment 7, wherein in a locked position of the first (1) and the second edge (1) there is a space (S) between the upper and outer parts of the first and second edge.

9. The set of embodiment 7 or 8, wherein each of the first and the second horizontal groove (9a, 9b) comprises an upper lip (12) and a lower lip (11), that the lower lip (11) of the first horizontal groove (9a) extends horizontally to or is within an upper and outer part of the first edge (1) and the lower lip (11) of the second horizontal groove (9b) extends horizontally to or is within an upper and outer part of the second edge (1').

10. The set of embodiments 7-9, wherein the strip part (6) comprises a vertically extending tongue body (30), wherein the first tongue (10a) protrudes from the vertically extending tongue body (30).

11. The set of any one of the preceding embodiments 7-10, wherein the locking system is configured to be locked by angling and/or vertical snapping of the first and the second tile (1a, 1b).

12. Ceramic tiles (1a,1b) provided with an embossed surface and a décor, characterized in that the embossing is in register with the décor, that the embossing comprises upper (44a) and lower (44b) surface portions wherein an upper surface portion (44a) comprises a different gloss level than a lower surface portion (44b).

13. Ceramic tiles of embodiment 12, wherein the décor is a wood design and wherein the different gloss levels are formed by a digitally applied powder.

14. A set of floor panels comprising a first (1a) and a second (1b) panel comprising a ceramic surface layer (27) and a core (28) comprising thermoplastic material mixed with wood or mineral fillers, characterized in:
that a mechanical locking system is formed in the core (28) of the first (1a) and the second panel (1b),
that the mechanical locking system comprises a strip (7) provided with a locking element (8) at a first edge (1) of the first panel (1a) and a locking groove (14) at a second edge (1') of the second panel (1b), wherein the locking element (8) and the locking groove (14) are configured to cooperate for locking of the first (1) and the second edge (1') in a horizontal direction parallel with the ceramic surface layer (27),
that the mechanical locking system comprises a tongue (10) at the second edge (1') and a tongue groove (9) formed in the first (1) edge, wherein the tongue (10) and the tongue groove (9) are configured to cooperate for locking of the first and the second edge (1,1') in a vertical direction perpendicular to the horizontal direction,
that the thickness of the ceramic surface layer is in the range of 2 mm to 5 mm, and
that the tongue groove (9) comprises an upper lip (12) that is essentially formed by the ceramic surface layer (27).

15. The set of embodiment 14, wherein in a locked position of the first (and the second edge (1,1') there is a space S of about 1-10 mm between the ceramic surface layers.

16. A pre formed ceramic tile (1) intended to be provide with a locking system characterized in that a groove (21, 14) is formed at the rear side of a tile edge (1).

17. A pre formed ceramic tile (1a) tile of embodiment 16, wherein a first thickness (T') of an outer edge of the pre formed ceramic tile is lower than a second average thickness (T) of the tile body of the pre formed ceramic tile.

18. A pre formed ceramic tile (1a) of embodiment 17, wherein the thickness difference between the first thickness (T') and the second average thickness (T) is about 1-3 mm.

19. A pre formed ceramic tile (1,1') of any one of the embodiments 16-18, wherein the groove is an equalizing groove (21) comprising an upper surface (21a) that is essentially parallel with an upper surface of the pre formed ceramic tile (1a), wherein the upper surface extends from the outer part of the edge and inwardly.

20. A pre formed ceramic tiles (1a) of embodiment 17-19, wherein the upper surface (21a) of the equalizing groove extends over a horizontal distance of about 3-20 mm.

21. A pre formed ceramic tiles (1,1') of embodiment 17-20, wherein the rear side of the pre formed ceramic tile edge (1) comprises a vertical groove (14) spaced from the outer edge and an equalizing groove (21) extending from the vertical groove (14) and to the outer part of the edge.

22. A set comprising a first tile (1a), a second tile (1b) and a strip part (6), which preferably comprises a polymer or metal material, wherein said first and second tile (1a,1b) are ceramic or stone tiles, characterized in
that a first edge (1) of the first tile (1a) or a second edge (1') of the second tile (4b) comprises a vertical groove (14a, 14b) and a horizontal groove (9a, 9b) formed in a body of the first or the second tile (1a, 1b), respectively,
that said strip part (6) is configured to be connected to one of the vertical grooves (14a, 14b) and one of the horizontal groove (9a, 9b), formed on the same edge, for vertical locking perpendicular to the tile surface and horizontal locking parallel to the tile surface of the first and the second tiles (1a,1b), and
that in locked position there is a space S between upper parts of the first and second edge (1,1').

23 The set of embodiment 22, wherein vertical (14a, 14b) and horizontal (9a, 9b) grooves are formed in the first edge (1) of the first tile (1a) and the second edge (1') of the second tile (4b) and wherein the strip part is configured to be connected to the horizontal (9a, 9b) and vertical (14a,14b) groves formed in the first (1) edge of the first tile (1a) and in the second (1') edge of the second tile (1b).

24. The set of embodiment 22 or 23, wherein the horizontal groove (9a, 9b) of the first edge (1) or the second edge (1') comprises an upper lip (12) and a lower lip (11), and wherein the lower lip (11) extends horizontally to or is within an upper and outer part of the respective first (1) or second (1') edge.

25. The set of any one of the embodiments 22-24, wherein the strip part (6) comprises a tongue (10a) having a vertically extending tongue body (30) located in the space (S).

26. The set of embodiment 25, wherein the tiles may be connected with vertical or horizontal snapping and wherein the tongue body (30) is displaced horizontally in the space (S) during locking.

The invention claimed is:

1. A set of ceramic or stone tiles comprising a first tile provided with a first edge and a second tile provided with a second edge, wherein the tiles are provided with a locking system for locking the first edge to the second edge in a horizontal direction parallel with a tile surface and in a vertical direction perpendicular to the horizontal direction,
wherein said locking system comprises:
a tongue and a horizontal groove for locking in the vertical direction, and
a locking element and a vertical groove for locking in the horizontal direction, and
wherein core grooves are formed in a rear side of the tiles for decreasing their weight.

2. The set according to claim 1, wherein the tiles are ceramic tiles having a thickness of 2-5 mm.

3. The set according to claim 1, wherein each tile comprises a tile body of a solid homogenous material.

4. The set according to claim 1, wherein the tiles are ceramic tiles produced with dry pressing of powder under high pressure.

5. The set according to claim 1, wherein each tile comprises a ceramic surface layer and a core comprising thermoplastic material mixed with wood or mineral fillers.

6. A set of ceramic or stone tiles comprising a first tile provided with a first edge and a second tile provided with a second edge, wherein the tiles are provided with a locking system for locking the first edge to the second edge in a horizontal direction parallel with a tile surface and in a vertical direction perpendicular to the horizontal direction,
  wherein said locking system comprises:
    a tongue and a horizontal groove for locking in the vertical direction, and
    a locking element and a vertical groove for locking in the horizontal direction, and
  wherein core grooves are formed in a rear side of the tiles for decreasing their weight,
  wherein the core grooves are covered with an underlay material.

7. The set according to claim 6, wherein the underlay material is bonded to the rear side.

8. The set according to claim 6, wherein the underlay material comprises a polymer material combined with glass fibers.

9. The set according to claim 1, wherein tiles comprise a digitally printed décor.

10. The set according to claim 1, wherein the tiles are provided with an embossed surface and a décor.

11. The set according to claim 10, wherein the embossing is in register with the décor.

12. The set according to claim 1, wherein the tongue and the locking element are provided on a separately formed strip part.

13. The set according to claim 1, wherein there is a space between an outer and upper part of the first edge and an outer and upper part of the second edge in a locked position of the first and the second edge.

14. The set according to claim 1, wherein the locking system is configured to be locked by angling and/or vertical snapping of the first and the second tile.

15. The set according to claim 1, wherein the core grooves of each of the tiles comprise a plurality of core grooves at one end portion of the rear side.

* * * * *